United States Patent
Sollner et al.

(10) Patent No.: US 9,291,737 B2
(45) Date of Patent: Mar. 22, 2016

(54) METHODS AND SYSTEMS FOR IMAGING SUBTERRANEAN FORMATIONS WITH PRIMARY AND MULTIPLE REFLECTIONS

(75) Inventors: Walter Sollner, Oslo (NO); Norman Daniel Whitmore, Jr., Houston, TX (US); Stian Hegna, Lysaker (NO); Charles Lameloise, Lysaker (NO); Rune Tonnessen, Oslo (NO); Gregg Parkes, Weybridge (GB)

(73) Assignee: PGS GEOPHYSICAL AS, Oslo (NO)

( * ) Notice: Subject to any disclaimer, the term of this patent is extended or adjusted under 35 U.S.C. 154(b) by 898 days.

(21) Appl. No.: 13/484,556

(22) Filed: May 31, 2012

(65) Prior Publication Data

US 2013/0322208 A1   Dec. 5, 2013

(51) Int. Cl.
*G01V 1/38* (2006.01)
*G01V 1/32* (2006.01)
*G01V 1/20* (2006.01)
*G01V 1/36* (2006.01)

(52) U.S. Cl.
CPC ............. *G01V 1/3843* (2013.01); *G01V 1/20* (2013.01); *G01V 1/325* (2013.01); *G01V 1/36* (2013.01); *G01V 1/3808* (2013.01); *G01V 2210/44* (2013.01); *G01V 2210/56* (2013.01); *G01V 2210/57* (2013.01)

(58) Field of Classification Search
CPC ....... G01V 1/325; G01V 1/36; G01V 1/3803; G01V 1/3843; G01V 1/20; G01V 2210/44; G01V 2210/56; G01V 2210/57
USPC .......................................................... 367/24
See application file for complete search history.

(56) References Cited

U.S. PATENT DOCUMENTS

| 6,903,998 B2 * | 6/2005 | Vaage ............................. 367/24 |
| 7,872,942 B2 | 1/2011 | Sollner |
| 8,902,698 B2 * | 12/2014 | Hegna et al. .................... 367/21 |

FOREIGN PATENT DOCUMENTS

| GB | 2381314 A | 4/2003 |
| WO | 2008005799 A2 | 1/2008 |

OTHER PUBLICATIONS

Ziolkowski, A., et al., "The signature of an air gun array: Computation from near-field measurements including interactions", Geophysics, vol. 47, No. 10, Oct. 1982, pp. 1413-1421.
Parkes, G.E., et al., "The signature of an air gun array: Computation from near-field measurements including interactions—Practical considerations", Geophysics, vol. 47, vol. 48, No. 2, Feb. 1984, pp. 105-111.

(Continued)

*Primary Examiner* — Mark Hellner

(57) ABSTRACT

Systems and methods for imaging subterranean formations using primary and multiple reflections are described. An exploration-seismology vessel tows a seismic source, a receiver acquisition surface located beneath a free surface, and a source acquisition surface positioned at a depth below the source. The receiver acquisition surface is used to measure pressure and normal velocity wavefields and the source acquisition surface is used to measure direct, down-going, source pressure wavefields generated by the source. The down-going source pressure wavefields in combination with the down-going pressure wavefields and up-going pressure wavefields computed from the pressure and velocity wavefields are used to compute images of the subterranean formation associated with primary reflections and multiple reflections.

22 Claims, 21 Drawing Sheets

(56) References Cited

OTHER PUBLICATIONS

Muijs, Remco, et al., Prestack depth migration of primary and surface-related multiple reflections: Part I—Imaging, Geophysics, vol. 72, No. 2, Mar.-Apr. 2007, pp. S59-S69.

Whitmore, N.D., et al., "Imaging of primaries and multiples using a dual-sensor towed streamer", SEG Denver Annual Meeting; 2010, pp. 3187-3192.

Lameloise, C. and Sollner, W., "Shallow Target Depth Imaging from Separated Wavefields", 73rd EAGE Conference & Exhibition, May 23, 2011, Abstract Only.

Partial Europoean Search Report issued in the prosecution of patent application No. 13169880.5, mailed Mar. 23, 2015, 8 pages.

D.J. Verschuur et al.: "Adaptive Surface-related Multiple Elimination", Geophysics, vol. 57, Sep. 1992,No. 9, pp. 1166-1177.

* cited by examiner

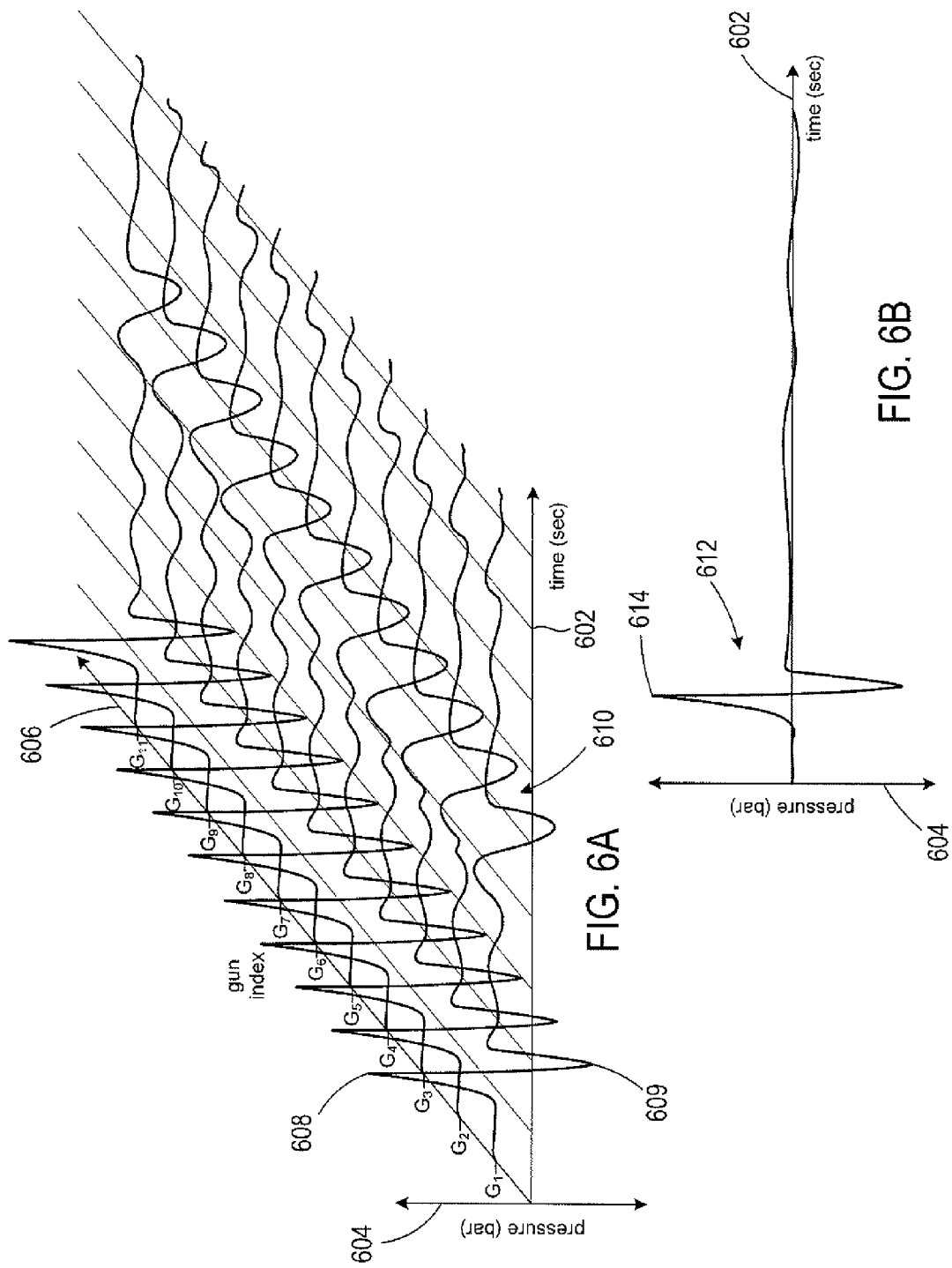

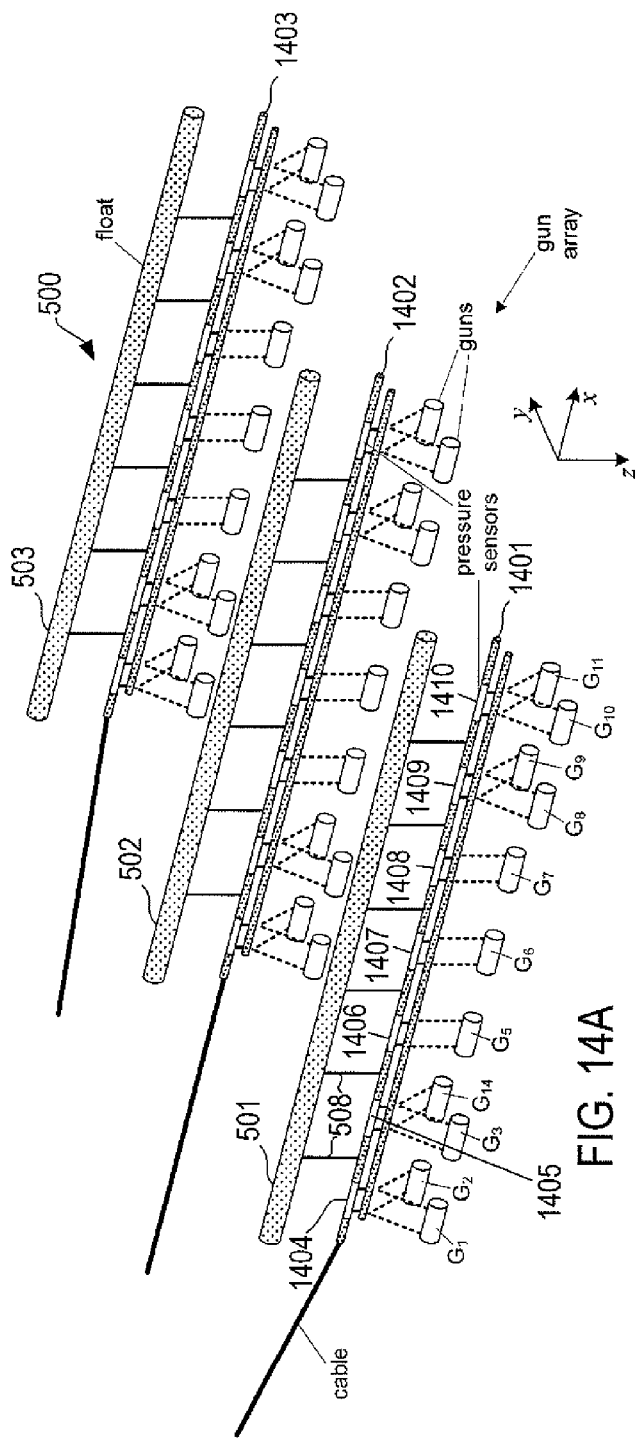
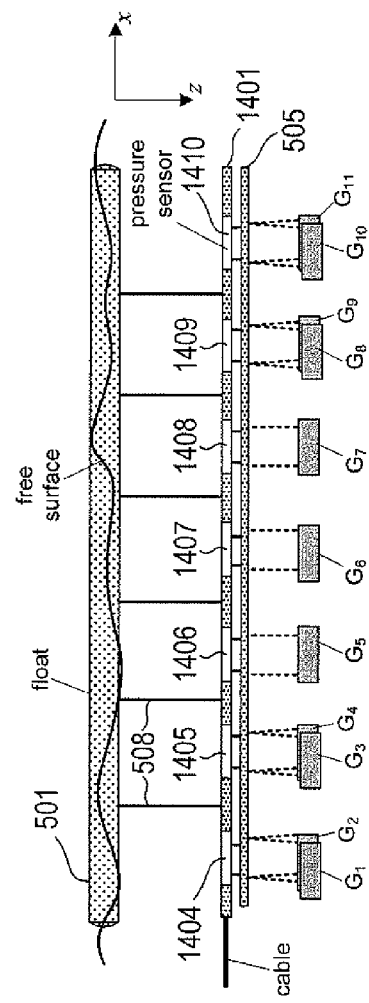
FIG. 14A
FIG. 14B

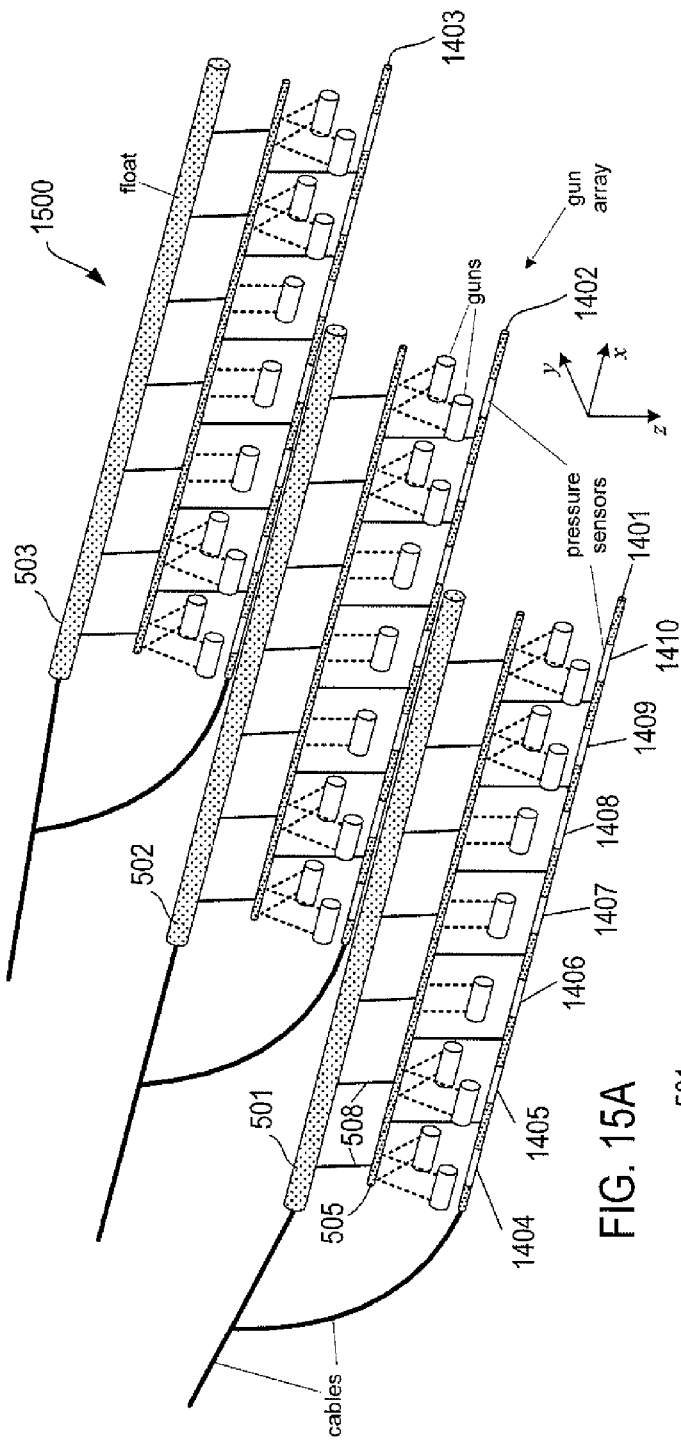
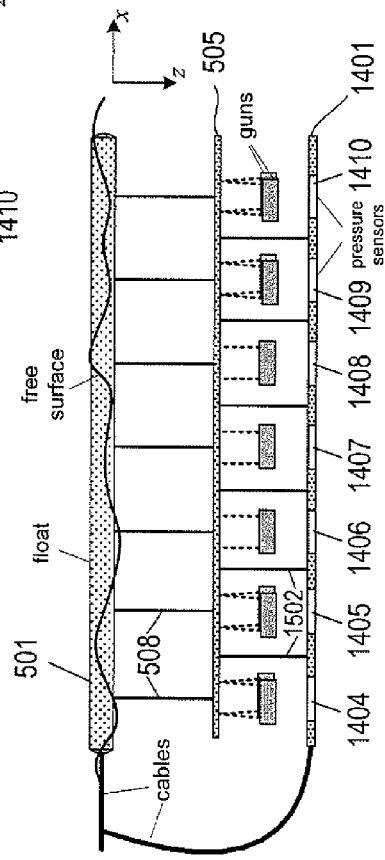
FIG. 15A
FIG. 15B

METHODS AND SYSTEMS FOR IMAGING SUBTERRANEAN FORMATIONS WITH PRIMARY AND MULTIPLE REFLECTIONS

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are essential for quantitative seismic interpretation and improved reservoir monitoring. For a typical marine seismic survey, an exploration-seismology vessel tows one or more seismic sources and one or more streamers that form a seismic data acquisition surface below the surface of the water and over a subterranean formation to be surveyed for mineral deposits. The vessel contains seismic acquisition equipment, such as navigation control, seismic source control, seismic receiver control, and recording equipment. The seismic source control causes the one or more seismic sources, which are typically air guns, to produce acoustic impulses at selected times. Each impulse is a sound wave that travels down through the water and into the subterranean formation. At each interface between different types of rock, a portion of the sound wave is refracted, a portion of the sound wave is transmitted, and another portion is reflected back toward the body of water to propagate up toward the water surface. The streamers towed behind the vessel are elongated cable-like structures. Each streamer includes a number of seismic receivers or sensors that detect pressure and/or velocity wavefields associated with the sound waves reflected back into the water from the subterranean formation.

Sound waves that propagate down into the subsurface and undergo a single reflection from an interface before being detected by seismic receivers are called "primary reflections," and sound waves that take several subsurface reflections before being detected by seismic receivers are called "multiple reflections." Multiple reflections may also be primary reflections that are subsequently reflected from the sea surface down into the subsurface before being detected by the receivers. In the past, conventional imaging techniques relied almost exclusively on the primary reflections. As a result, significant computational effort was dedicated to attenuating the multiple reflections. In recent years, however, the multiple reflections have been recognized as providing additional, valuable information about the subterranean formation. In particular, multiple reflections that include at least one reflection from the sea-surface, called "sea-surface multiples," are typically the strongest and most significant of the multiple reflections to use in imaging a subterranean formation. When a subterranean formation is imaged with wavefields associated with the primary and multiple reflections, the direct incident wavefield that originates from the source is significant for using the primary reflections in the imaging process. However, due to the large minimal lateral distance between the source and the nearest receivers and the large distance between streamers of a typical acquisition system, measurement of the direct incident wavefield is difficult. As a result, those working in the petroleum industry continue to seek systems and methods that can be used to measure the direct incident wavefield.

DESCRIPTION OF THE DRAWINGS

FIG. 6A shows an example plot of hypothetical, far-field gun signatures.

FIG. 6B shows an example plot of hypothetical resulting far-field signature associated with a seismic source.

FIGS. 14A-14B show isometric and side elevation views, respectively, of a source that includes a source acquisition surface.

FIGS. 15A-15B show isometric and side elevation views, respectively, of a source that includes a source acquisition surface.

DETAILED DESCRIPTION

Systems and methods for imaging subterranean formations using primary and multiple reflections are described. An exploration-seismology vessel tows a number of streamers that form a receiver acquisition surface located beneath an air/fluid surface referred to as the "free surface." The streamers include receivers that measure pressure and normal velocity wavefields that are digitally encoded and stored. The vessel also tows an acoustic source and a source acquisition surface positioned at a depth substantially below the source.

The source acquisition surface includes a number of pressure sensors to measure direct, down-going, source pressure wavefields generated by the source, which are digitally encoded and stored. The down-going source pressure wavefields and up-going pressure wavefields computed from the pressure and velocity wavefields can be used to compute images of the subterranean formation associated with primary reflections. The pressure and normal velocity wavefields can be used to separate the pressure wavefield into up-going and down-going pressure wavefields on the receiver end (or predefined extrapolation level), which can be used to compute images of the subterranean formation associated with multiple reflections. The images associated with the primary and multiple reflections can be combined to form an image of the subterranean formation. Alternatively, when the complete down-going pressure wavefield includes the down-going source wavefield and the down-going reflected (or scattered) wavefield at an arbitrary extrapolation level, images of the subterranean formation associated with primary and multiple reflections can be computed in a single computational operation.

The following discussion includes three subsections: an overview of exploration seismology, examples of seismic sources and acquisition surfaces, and computational methods for imaging a subterranean formation with primary and multiple reflections as an example of computational processing methods and systems. Reading of the first subsection can be omitted by those already familiar with marine exploration seismology.

An Overview of Marine Exploration Seismology

Figure 1:
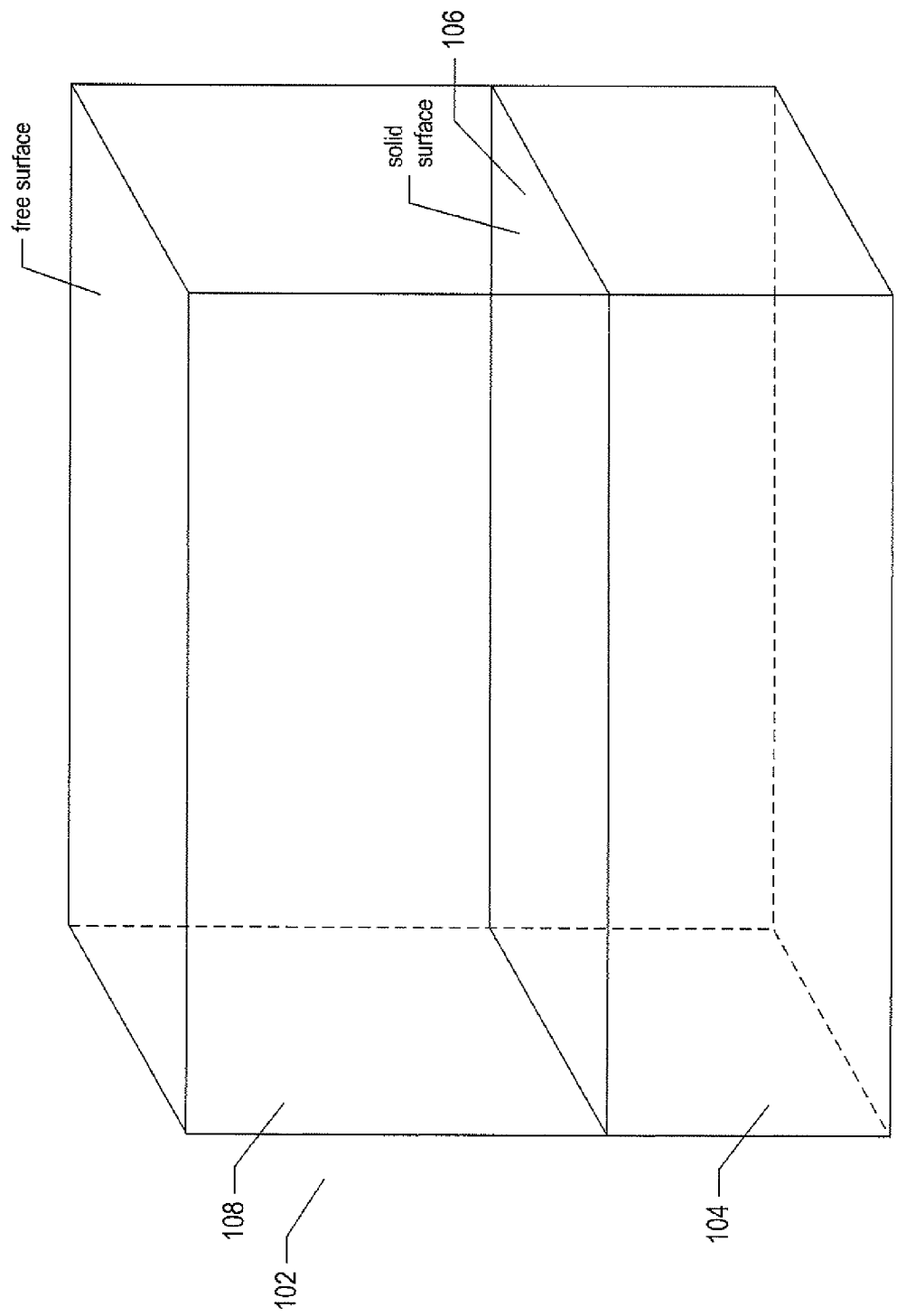
FIG. 1 shows a domain volume of the earth's surface.

FIG. 1 shows a domain volume of the earth's surface. The domain volume 102 comprises a solid volume of sediment and rock 104 below the solid surface 106 of the earth that, in turn, underlies a fluid volume of water 108 within an ocean, an inlet or bay, or a large freshwater lake. The domain volume shown in FIG. 1 represents an example experimental domain for a class of exploration-seismology observational and analytical techniques and systems referred to as "marine exploration seismology."

Figure 2:
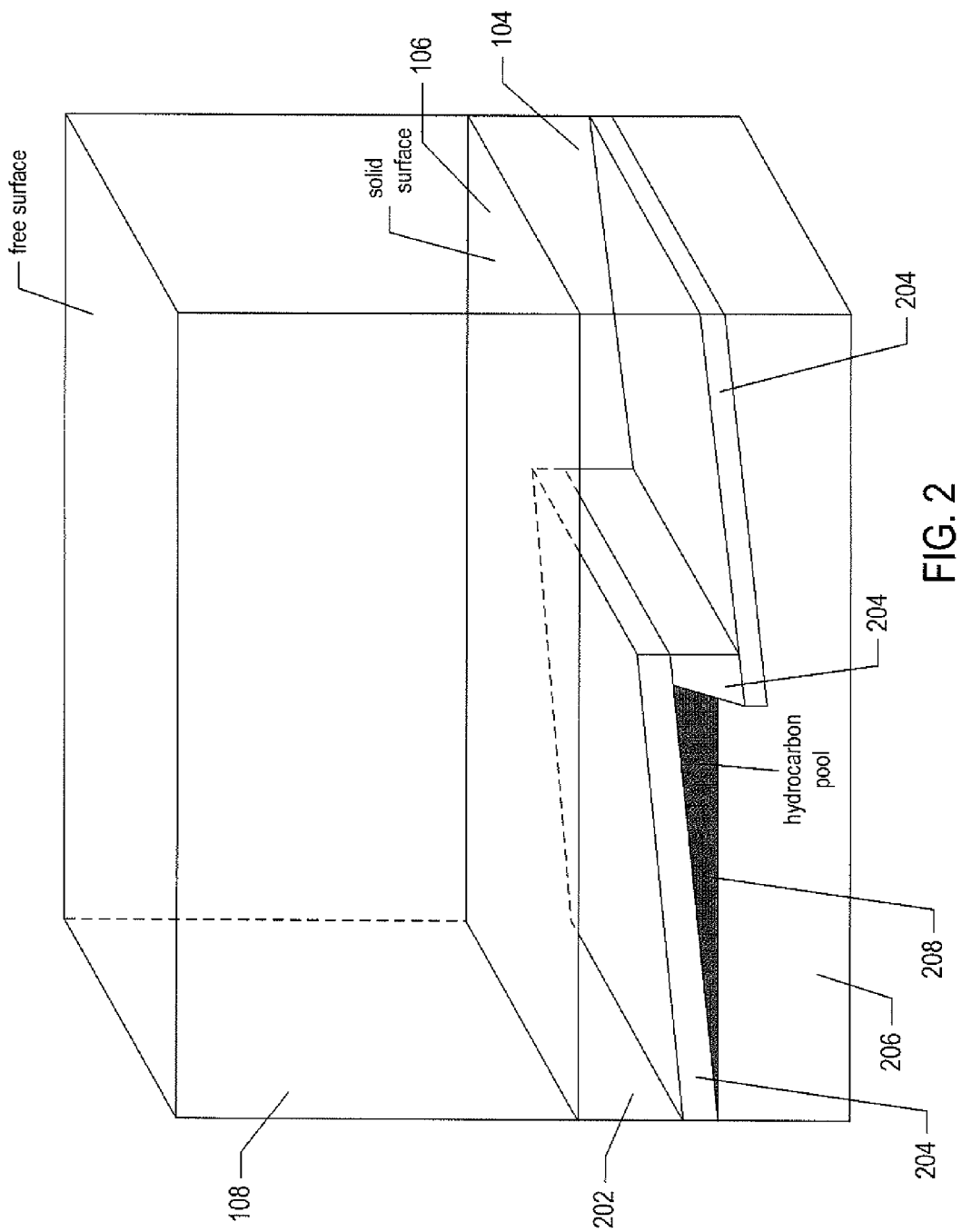
FIG. 2 shows subsurface features of a subterranean formation in the lower portion of the domain volume shown in FIG. 1.

FIG. 2 shows subsurface features of a subterranean formation in the lower portion of the domain volume shown in FIG. 1. As shown in FIG. 2, for exploration-seismology purposes, the fluid volume 108 is a relatively featureless, generally homogeneous volume overlying the solid volume 104 of interest. However, while the fluid volume 108 can be explored, analyzed, and characterized with relative precision using many different types of methods and probes, including remote-sensing submersibles, sonar, and other such devices and methods, the volume of solid crust 104 underlying the fluid volume is comparatively far more difficult to probe and characterize. Unlike the overlying fluid volume 108, the solid volume 104 is significantly heterogeneous and anisotropic, and includes many different types of features and materials of interest to exploration seismologists. For example, as shown in FIG. 2, the solid volume 104 may include a first sediment layer 202, a first fractured and uplifted rock layer 204, and a second, underlying rock layer 206 below the first rock layer. In certain cases, the second rock layer 206 may be porous and contain a significant concentration of liquid hydrocarbon 208 that is less dense than the second-rock-layer material and that therefore rises upward within the second rock layer 206. In the case shown in FIG. 2, the first rock layer 204 is not porous, and therefore forms a lid that prevents further upward migration of the liquid hydrocarbon, which therefore pools in a hydrocarbon-saturated layer 208 below the first rock layer 204. One goal of exploration seismology is to identify the locations of hydrocarbon-saturated porous strata within volumes of the earth's crust underlying the solid surface of the earth.

Figure 3A:
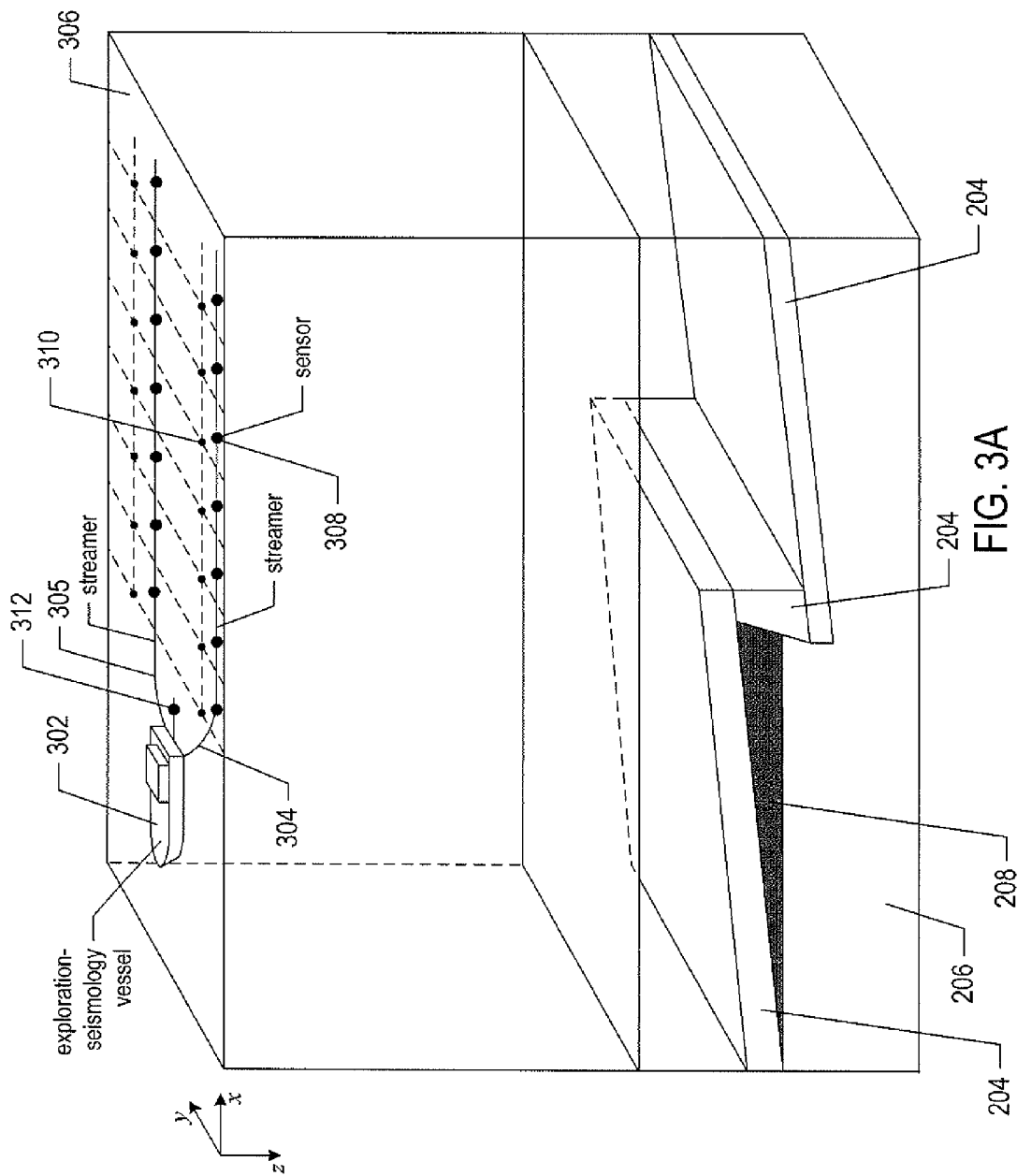
FIGS. 3A-3C show an exploration-seismology method by which digitally encoded data is instrumentally acquired for subsequent exploration-seismology processing and analysis in order to characterize the structures and distributions of features and materials underlying the solid surface of the earth.
Figure 3B:
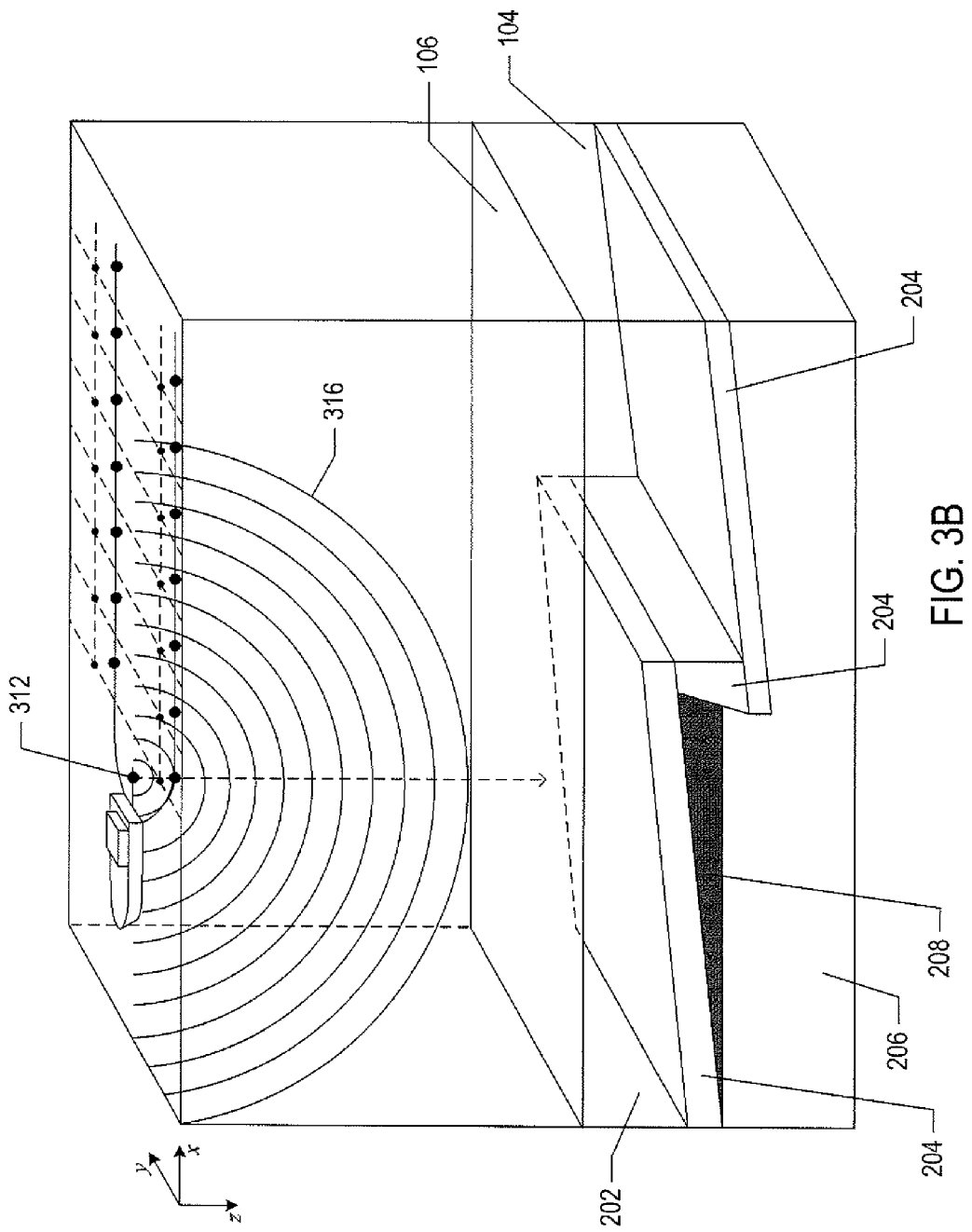
Figure 3C:
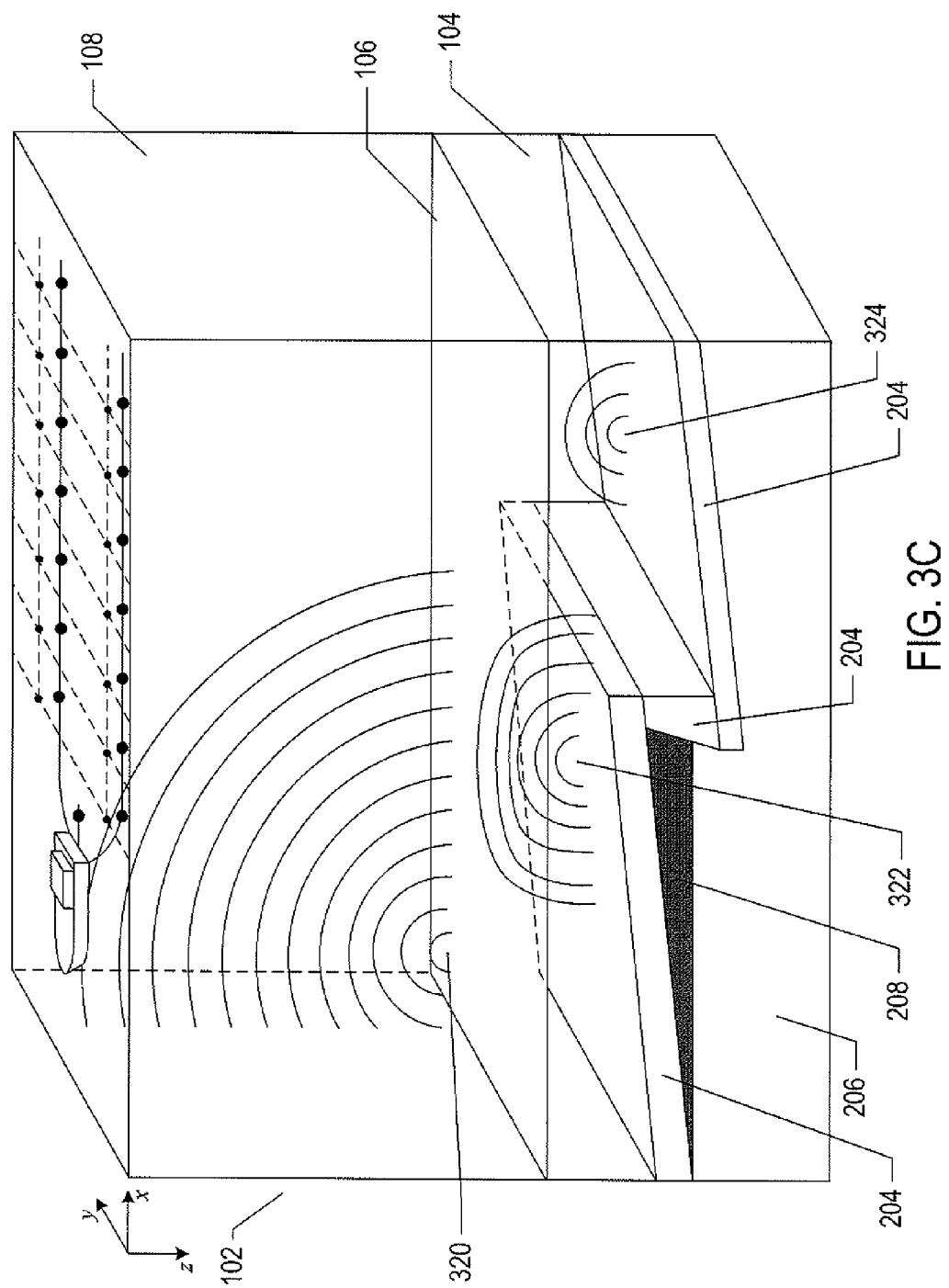

FIGS. 3A-3C show an exploration-seismology method by which digitally encoded data is instrumentally acquired for subsequent exploration-seismology processing and analysis in order to characterize the structures and distributions of features and materials of a subterranean formation. FIG. 3A shows an example of an exploration-seismology vessel 302 equipped to carry out a continuous series of exploration-seismology experiments and data collections. In particular, the vessel 302 tows one or more streamers 304-305 across an approximately constant-depth plane generally located a number of meters below the free surface 306. The streamers 304-305 are long cables containing power and data-transmission lines to which receivers, also referred to as "sensors," are connected at regular intervals. In one type of exploration seismology, each receiver, such as the receiver represented by the shaded disk 308 in FIG. 3A, comprises a pair of seismic receivers including a geophone that detects vertical displacement within the fluid medium over time by detecting particle motion, velocities or accelerations, and a hydrophone that detects variations in pressure over time. The streamers 304-305 and the vessel 302 include sophisticated sensing electronics and data-processing facilities that allow receiver readings to be correlated with absolute positions on the free surface and absolute three-dimensional positions with respect to an arbitrary three-dimensional coordinate system. In FIG. 3A, the receivers along the streamers are shown to lie below the free surface 306, with the receiver positions correlated with overlying surface positions, such as a surface position 310 correlated with the position of receiver 308. The vessel 302 also tows one or more acoustic-wave sources 312 that produce pressure impulses at spatial and temporal intervals as the vessel 302 and towed streamers 304-305 move across the free surface 306.

FIG. 3B shows an expanding, spherical acoustic wavefront, represented by semicircles of increasing radius centered at the acoustic source 312, such as semicircle 316, following an acoustic pulse emitted by the acoustic source 312. The wavefronts are, in effect, shown in vertical plane cross section in FIG. 3B. As shown in FIG. 3C, the outward and downward expanding acoustic wavefield, shown in FIG. 3B, eventually reaches the solid surface 106, at which point the outward and downward expanding acoustic waves partially reflect from the solid surface and partially refract downward into the solid volume, becoming elastic waves within the solid volume. In other words, in the fluid volume, the waves are compressional pressure waves, or P-waves, the propagation of which can be modeled by the acoustic-wave equation while, in a solid volume, the waves include both P-waves and transverse waves, or S-waves, the propagation of which can be modeled by the elastic-wave equation. Within the solid volume, at each interface between different types of materials or at discontinuities in density or in one or more of various other physical characteristics or parameters, downward propagating waves are partially reflected and partially refracted, as at solid surface 106. As a result, each point of the solid surface and within the underlying solid volume 104 becomes a potential secondary point source from which acoustic and elastic waves, respectively, may emanate upward toward receivers in response to the pressure impulse emitted by the acoustic source 312 and downward-propagating elastic waves generated from the pressure impulse.

As shown in FIG. 3C, secondary waves of significant amplitude are generally emitted from points on or close to the solid surface 106, such as point 320, and from points on or very close to a discontinuity in the solid volume 104, such as points 322 and 324. Tertiary waves may be emitted from the free surface 306 back towards the solid surface 106 in response to secondary waves emitted from the solid surface and subsurface features.

FIG. 3C also shows the fact that secondary waves are generally emitted at different times within a range of times following the initial pressure impulse. A point on the solid surface 106, such as point 320, receives a pressure disturbance corresponding to the initial pressure impulse more quickly than a point within the solid volume 104, such as points 322 and 324. Similarly, a point on the solid surface directly underlying the acoustic source receives the pressure impulse sooner than a more distant-lying point on the solid surface. Thus, the times at which secondary and higher-order waves are emitted from various points within the solid volume are related to the distance, in three-dimensional space, of the points from the acoustic source.

Acoustic and elastic waves, however, travel at different velocities within different materials as well as within the same material under different pressures. Therefore, the travel times of the initial pressure impulse and secondary waves emitted in response to the initial pressure impulse are complex functions of distance from the acoustic source as well as the materials and physical characteristics of the materials through which the acoustic wave corresponding to the initial pressure impulse travels. In addition, as shown in FIG. 3C for the secondary wave emitted from point 322, the shapes of the expanding wavefronts may be altered as the wavefronts cross interfaces and as the velocity of sound varies in the media traversed by the wave. The superposition of waves emitted from within the domain volume 102 in response to the initial pressure impulse is a generally very complicated wavefield that includes information about the shapes, sizes, and material characteristics of the domain volume 102, including information about the shapes, sizes, and locations of the various reflecting features within the subterranean formation of interest to exploration seismologists.

Examples of Seismic Sources and Source Acquisition Surfaces

Figure 4A:
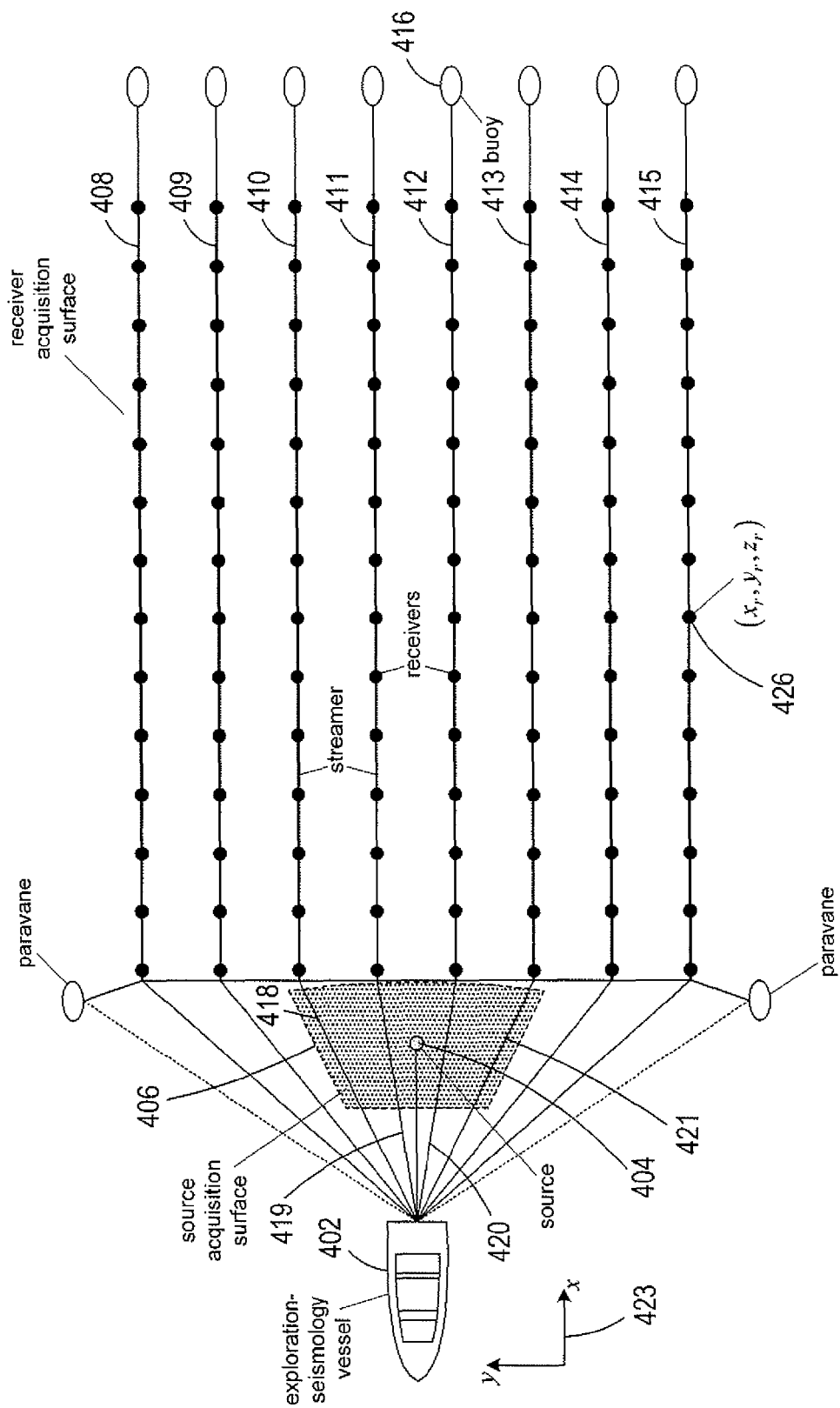
FIGS. 4A-4B show top and side-elevation views, respectively, of an exploration seismology vessel towing a source, a source acquisition surface, and receiver streamers.
Figure 4B:
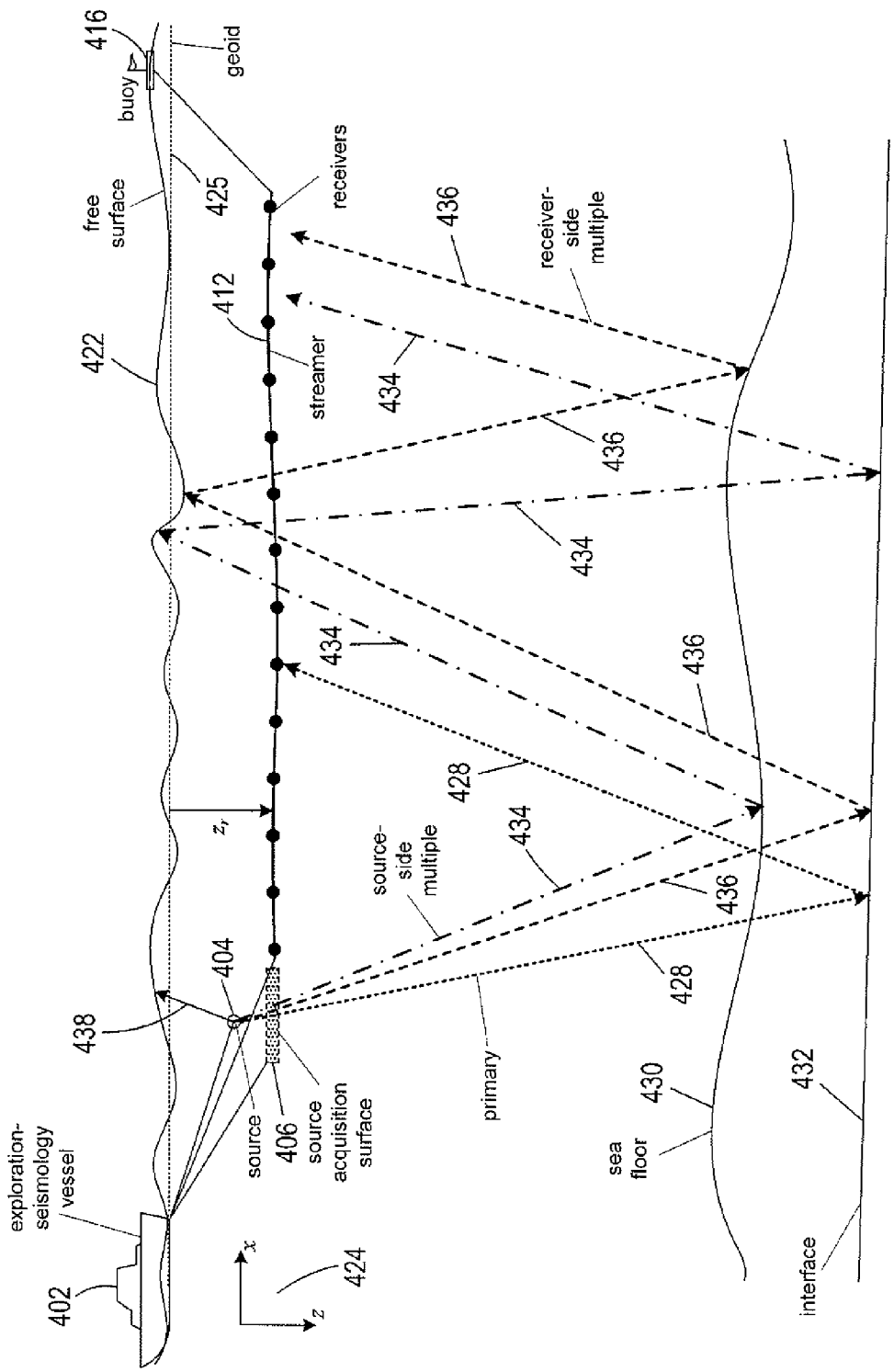

FIGS. 4A-4B show top and side-elevation views, respectively, of an exploration seismology vessel 402 towing a source 404, a source acquisition surface 406, and eight separate streamers 408-415 located beneath a free surface. In FIG. 4A, each streamer is attached at one end to the vessel 402 via a streamer data transmission cable and at the opposite end to a buoy, such as a buoy 416 attached to the steamer 412. For example, streamers 410-413 are attached to the vessel 402 via streamer data transmission cables 418-421, respectively. The streamers 408-415 ideally form a planar horizontal receiver acquisition surface located beneath the free surface. However, in practice, the receiver acquisition surface can be smoothly varying due to active sea currents and weather conditions. In other words, the towed streamers may undulate as a result of dynamic conditions of the fluid. FIG. 4B represents a snapshot, at an instant in time, of the undulating free surface 422 and corresponding smooth wave-like shape in the streamer 412. FIG. 4A includes an xy-plane 423 and FIG. 4B includes an xz-plane 424 of the same Cartesian coordinate system used to specify orientations and coordinate locations within the fluid volume with respect to three orthogonal, spatial coordinate axes labeled x, y and z. The x coordinate uniquely specifies the position of a point in a direction parallel to the length of the streamers, and the y coordinate uniquely specifies the position of a point in a direction perpendicular to the x axis and substantially parallel to the free surface 422, and the z coordinate uniquely specifies the position of a point perpendicular to the xy-plane with the positive z-direction pointing down away from the free surface. As shown in FIG. 4B, the streamer 412 is at a depth, $z_r$, below the free surface, which can be estimated at various locations along the streamers from hydrostatic pressure measurements made by depth controllers (not shown), such as paravanes or water kites, attached to the streamers. The depth controllers are typically placed at about 300 meter intervals along each streamer. The estimated streamer depths are then used to calculate a two-dimensional interpolated streamer shape that approximates the wave-like shape of an actual streamer at an instant in time. Alternatively, the estimated streamer depths can be used to calculate a three-dimensional interpolated surface approximation of the acquisition surface. The depth $z_r$ and the elevation of the free-surface profile are estimated with respect to the geoid, which is represented in FIG. 4B by dotted line 425. The geoid is the hypothetical surface of the earth that coincides everywhere with mean sea level and is used to define zero elevation (i.e., z=0). In FIGS. 4A and 48, shaded disks, such as shaded disk 426 in FIG. 4A, represent receivers spaced at regular intervals. The coordinates of the receiver 426 are given by $(x_r, y_r, z_r)$, where the depth $z_r$ can be an interpolated value.

FIG. 4B also shows examples of primary and multiple reflections. Dotted directional arrows 428 represent a "primary reflection" in which sound waves associated with a sound impulse generated by the source 406 pass directly from the source 406 through the source acquisition surface 406 and enter the sea floor 430 to undergo a reflection from a subterranean interface 432 back into the fluid volume to be measured by the receivers of the receiver acquisition surface. FIG. 4B also shows examples of source-side and receiver-side fluid-layer multiple reflections. Dot-dashed directional arrows 434 represent source-side fluid-layer multiples in which a sound wave generated by the source 404 passes through the source acquisition surface 406 before undergoing multiple reflections consisting of a sequence of reflections from the sea floor 430, and reflections from the free surface 422, and followed by a reflection from the interface 432 before being measured by the receivers of the receiver acquisition surface. Dot-dashed directional arrows 436 represent receiver-side fluid-layer multiples in which a sound wave generated by the source 404 passes through the source acquisition surface 406 before undergoing multiple reflections consisting of a reflection from the interface 432, a sequence of reflections from the free surface 422, and a reflections from the sea floor 430 before being measured by the receivers the receiver acquisition surface. The source 406 also produces sound waves that are first reflected from the free surface, as represented by directional arrow 438, before the waves travel into the subterranean formation to produce scattered wavefields directed back toward the free surface. These type of sound waves are called "source ghosts," which are time delayed relative to the sound waves that travel directly from the source 404 to the subterranean formation. Source ghosts can amplify some frequencies and attenuate other frequencies and are typically manifest as spectral notches in the recorded seismic waveforms, which make it difficult to obtain accurate high-resolution seismic images of the subterranean formation.

The seismic source 404 can implemented as an array of seismic source elements, such as air guns, water guns, or vibrator sources, in order to overcome undesirable aspects of a signature associated with a single source element. FIGS.

Figure 5A:
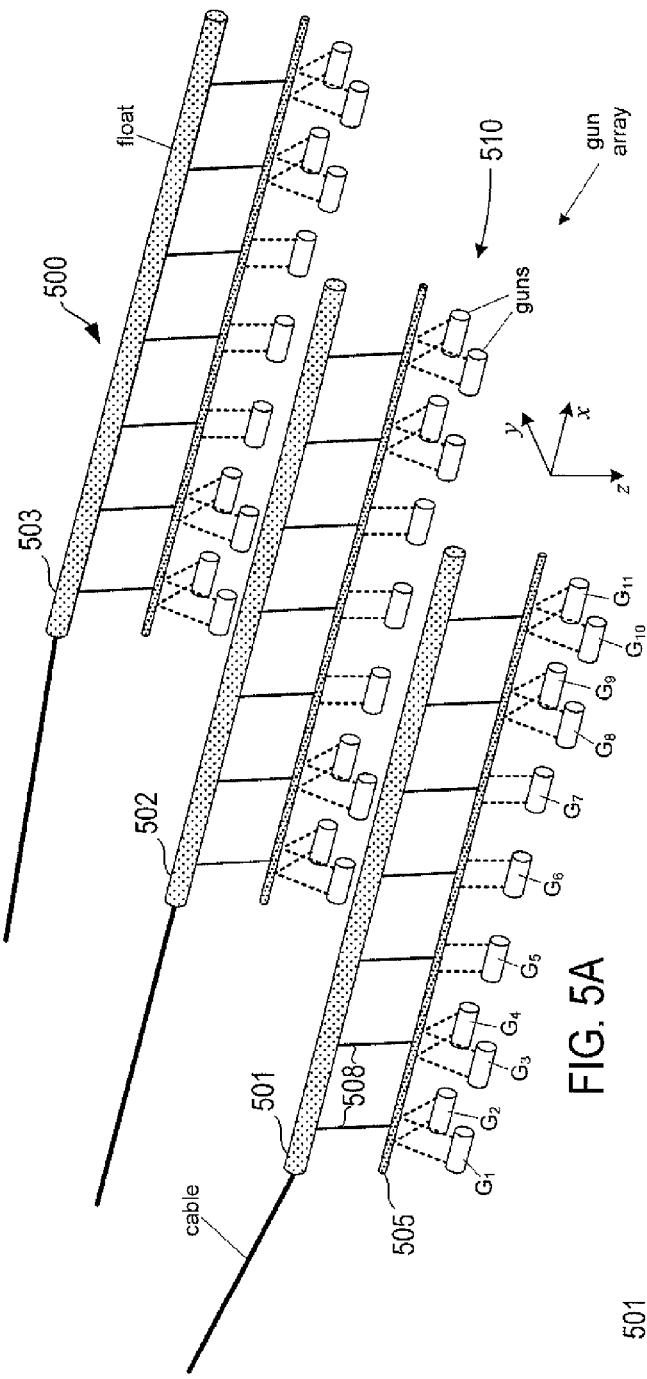
FIGS. 5A-5B show an isometric view and a side elevation view, respectively, of an example seismic source.

5A-5B show an isometric view and a side elevation view, respectively, of an example seismic source 500. The source 500 includes three separate floats 501-503 and three separate corresponding rods 505-507 suspended from the floats 501-503. Each rod is suspended from a corresponding float by a number of ropes or cables, such as cables 508 that suspend the rod 505 below the float 501. In the example of FIG. 5A, eleven guns are suspended from each of the rods. For example, eleven guns denoted by $G_1$-$G_{11}$ are suspended from the rod 505. In other words, the source 500 is composed of a thirty-three gun array 510. Consider, for example, air guns. Each air gun injects a high pressure bubble of air into the fluid as a source of energy to generate acoustic pressure waves that radiate outward. In other words, when a bubble is released from a gun there is a radial displacement of the water from the center of the bubble and a pressure disturbance is propagated outward in the fluid. As the bubble expands the pressure of the air in the bubble drops until it falls to that of the surrounding fluid, but inertia causes the bubble to over expand so that the air pressure in the bubble is less than the hydrostatic pressure of the surrounding fluid. Then the greatly expanded bubble contracts due to the hydrostatic pressure of the surrounding fluid. The process of expansion and contraction continues with the bubble oscillating through many cycles. As the bubble oscillates and the bubble pressure varies, pressure waves radiate outward into the fluid. The bubble oscillation amplitude decreases with time, and the period of oscillation decreases from one cycle to the next. The pressure variation in the fluid as a function of time caused by the bubble is called the "gun signature." The detailed features of a signature are determined by the subsequent motion of the bubble following its release from a gun.

Each gun has an associated near-field signature and a far-field signature. "Near field" and "far field" are terms used to describe proximity of an observation point to a gun when the signature is measured. For a gun that releases a pressure wave with a wavelength $\lambda=c/f$, where c is the speed of sound in the fluid, and f is the frequency, the near-field and far-field radial regions surrounding the gun can be defined as:

Near field: $d<\lambda$
Intermediate field: $d\sim\lambda$
Far field: $\lambda<<d$ where d is the distance from the gun to an observation point.

Figure 5B:
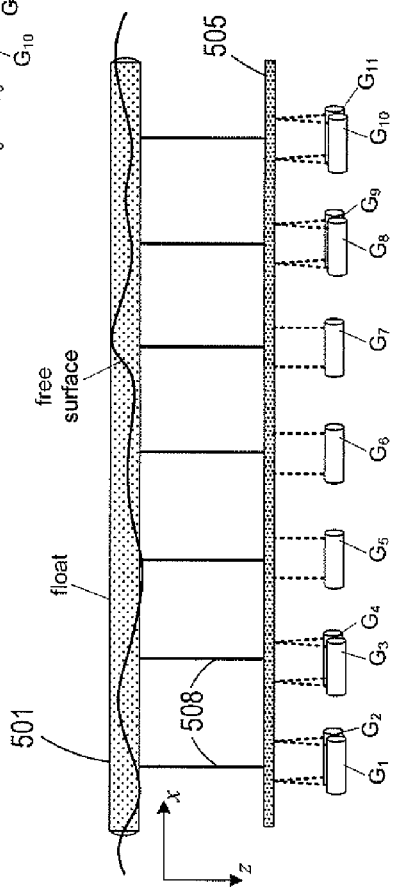
Figure 5C:
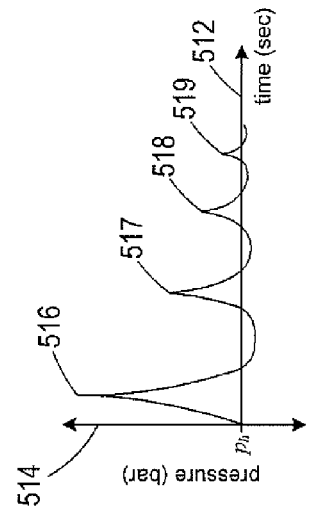
FIG. 5C represents a plot of a hypothetical near-field signature associated with a gun.

FIG. 5C represents a plot of a hypothetical near-field signature associated with a gun. Horizontal axis 512 represents time, and vertical axis 514 represents pressure. First peak 516 represents the initial build-up and release of a bubble from the gun into the fluid, after which, subsequent peaks 517-519 represent a decrease in amplitude with increasing time. The near-field signature reveals that the pressure after reaching a peak falls to values below the hydrostatic pressure, $p_h$. The bubble oscillation amplitude decreases as time passes and the bubble period of oscillation is not constant from one cycle to the next. In other words, the bubble motion is not simple harmonic motion. The chamber volume of a gun determines the associated near-field signature and is also influenced by the pressure waves created by other guns in the gun array. In general, the larger the chamber volume the larger the peak amplitudes and the longer the bubble periods of the associated near-field signatures.

The guns of a gun array are selected with different chamber volumes and arranged in a particular manner in order to generate a resulting far-field seismic wave with a short and narrow signature in the vertical-downward direction and with a spectrum that is smooth and broad over a frequency band of interest. FIG. 6A shows an example plot of hypothetical, far-field gun signatures associated with the eleven guns $G_1$-$G_{11}$ shown in FIG. 5. Horizontal axis 602 represents time, vertical axis 604 represents pressure, and diagonal axis 606 represents the indices of the guns $G_1$-$G_{11}$. Each far-field signature includes a first large positive peak following in time by a second large negative peak, which is followed by a series of lower amplitude non-periodic oscillations. For example, the far-field signature associated with gun $G_1$ has a first large positive peak 608, a second large negative peak 609 and a series of non-periodic oscillations 610 associated with damped oscillations of a bubble released from the gun $G_1$ as measured by a pressure sensor in the far field. The first large positive peak of each far-field signature is the initial pressure release of the bubble from the gun in the far field and is called the "primary peak." The second large negative peak of each far-field signature represents the initial pressure release reflected from the free surface and is called the "source ghost." The guns $G_1$-$G_{11}$ are selected with different air chamber volumes to produce different damped bubble oscillations following the primary peaks. FIG. 6A represents the far-field signatures associated with the guns $G_1$-$G_{11}$ when the guns are fire simultaneously. As a result, each far-field signature has a primary peak at approximately the same point in time. The far-field signatures associated with each of the individual guns of a gun array do not combine according to the principle of superposition. If interactions between pressure waves generated by the guns in a gun array were negligible or nonexistent, the far-field signatures could be combined according the principle of superposition to calculate a desirable resultant far-field signature of the gun array. However, interactions between the pressure waves created by the guns are not negligible, especially at low frequencies. Instead, the guns $G_1$-$G_{11}$ are selected with different chamber volumes, gun spacing, and gun positions within the gun array in order to amplify the primary peaks and cancel the damped bubble oscillations to produce a hypothetical resulting far-field source signature 612 of the guns $G_1$-$G_{11}$ plotted in FIG. 6B. The resulting far-field source signature 612 has an amplified primary 614 followed in time by very small amplitude oscillations. The resulting amplified primary 614 is an example of the direct down-going pressure wavefield used to produce the primary reflection 428 described above with reference to FIG. 4B.

Note that seismic sources are not intended to be limited to the example thirty-three gun array 610 shown in FIG. 6A. In practice, seismic sources can be configured with one or more floats and each float can have any number of guns suspended from the float. The guns can be arranged and selected with chamber volumes to produce a resulting far-field source signature that substantially matches the example resulting far-field source signature shown in FIG. 6B.

Figure 7A:
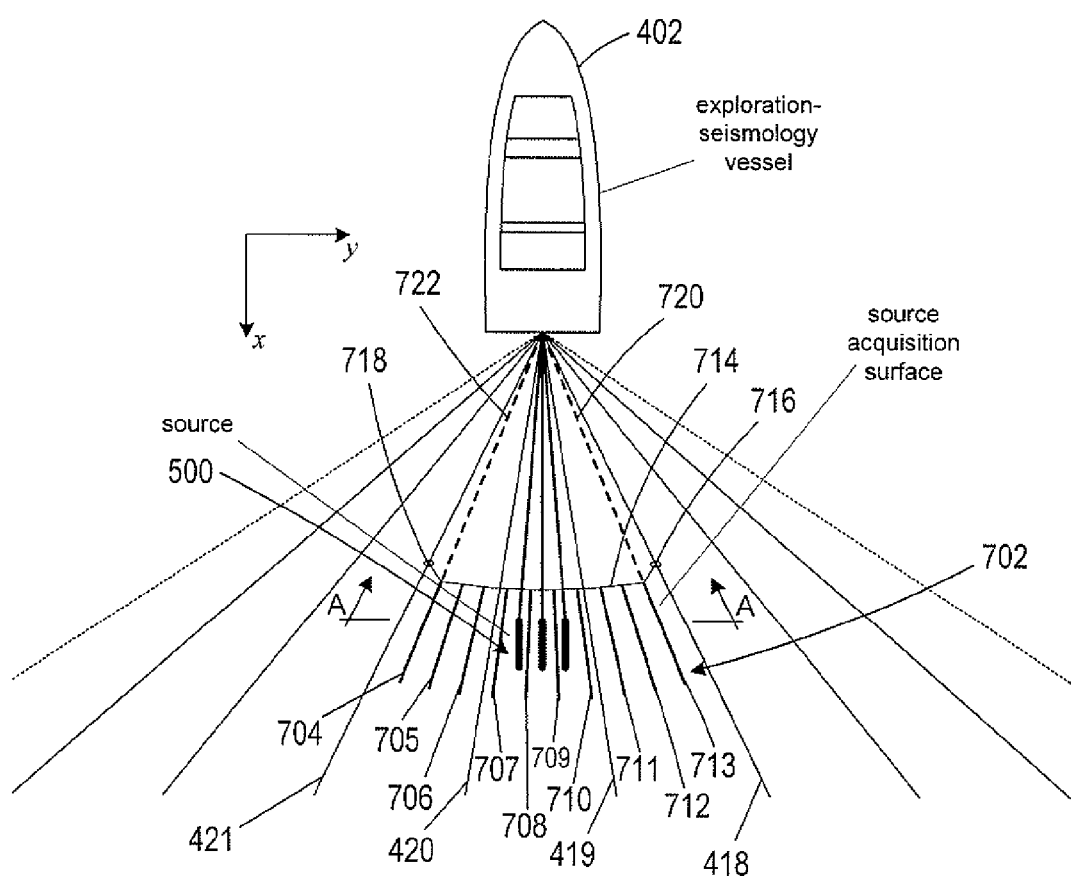
FIGS. 7A-7B shows top and side elevation views, respectively, of an example source acquisition surface.
Figure 7B:
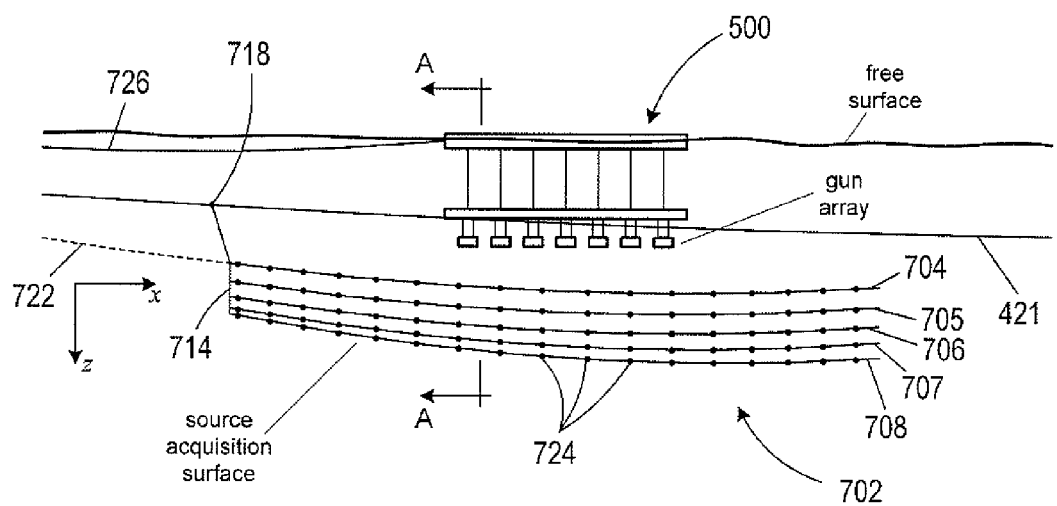
Figure 7C:
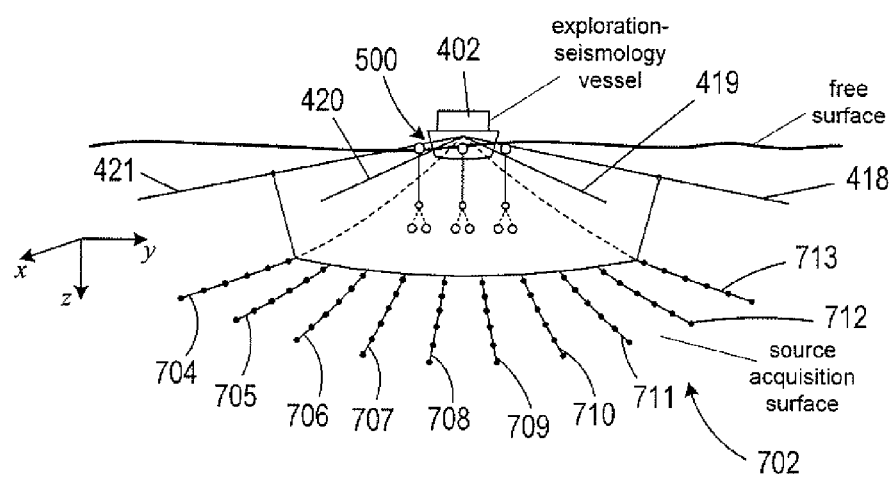
FIG. 7C shows a cross-sectional view of the source acquisition surface shown in FIGS. 7A-7B, along a line A-A, looking toward a seismic exploration vessel.

FIG. 7A shows a top view of an example source acquisition surface 702 located beneath the source 500 shown in FIG. 5. The source acquisition surface 702 includes ten source streamers 704-713 connected to a transverse data transmission cable 714, which is connected at a first end to a sliding collar 716 and is connected at a second end to a sliding collar 718. The sliding collars 716 and 718 are, in turn, attached to streamer transmission cables 418 and 421, respectively. In other words, the source acquisition surface 702 hangs in the fluid from the streamer transmission cables 418 and 421. The source acquisition surface 702 is also connected to the vessel 402 via source data transmission cables 720 and 722. Transmission cable 720 is connected at a first end to the cable 714 and is connected at a second end to the vessel 402, and the transmission cable 722 is connected at a first end to the cable 714 and is connected at a second end to the vessel 402. As shown in the example of FIG. 7A, the source streamers are shorter in length than the streamers of the receiver acquisition surface shown in FIG. 4. FIG. 7B shows a side elevation view of the source acquisition surface 702 located beneath the source 500, which is attached to the vessel (not shown) via source cables, such as source cable 726. Source streamers 709-713 are located behind streamers 704-708 and are not shown in FIG. 7B. The source streamers 704-713 are weighted to form a curved source acquisition surface 702 with the heaviest source streamers 708 and 709 located beneath the source 500 and the lightest source streamers 704 and 713 located farthest from the source 500. For example in FIG. 7B, the streamer 704 is lighter than streamer 705, which, in turn, is lighter than streamer 706 and so on. Shaded circles, such as shaded circles 724, represent receivers (or groups of receivers) distributed at regular intervals along the strings of source elements 704-708, or receivers distributed over a grid at a level under the sources. The receivers may be pressure sensors (or groups of pressure sensors arranged along the normal to the acquisition surface) or pressure sensors in combination with particle motion sensors. FIG. 7C shows a cross-sectional view of the source acquisition surface shown in FIGS. 7A-7B, along a line A-A, looking toward the back of the vessel 402.

The source 500 is operated as described above with reference to FIGS. 5-6 to generate a wavefield that is measured by the receivers of the source acquisition surface 702. The wavefield measured at each receiver of the surface 702 is transmitted as a signal along a corresponding source streamer to the transmission cable 714. The signals are then transmitted from the data transmission cable 714 to the transmission cables 720 and 722, which carry the signals to the vessel 402.

In the example of FIG. 7, the source acquisition surface 702 is located beneath the level of the gun array. In practice, the source acquisition surface can be located closer to the gun array with source streamers located to the outside of the source acquisition surface at approximately the same level as, or above, the gun array.

Figure 8A:
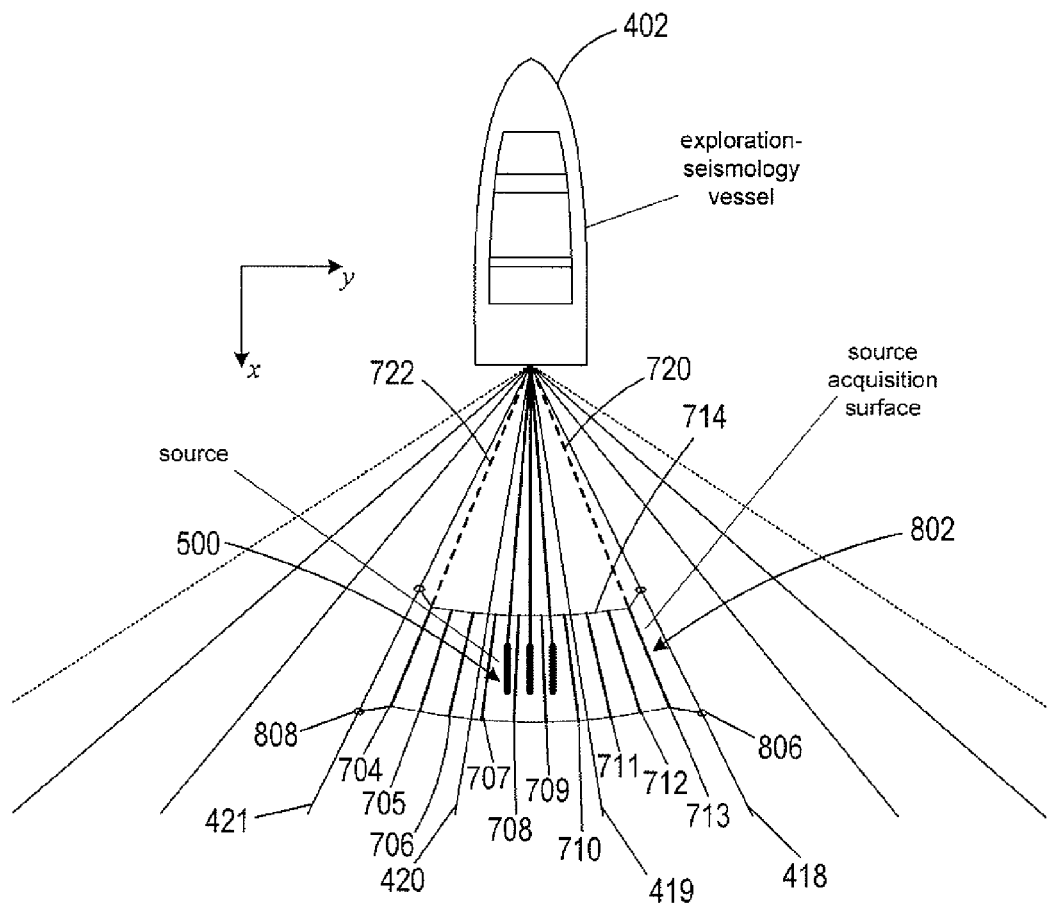
FIGS. 8A-8B show top and side elevation views, respectively, of an example source acquisition surface.
Figure 8B:
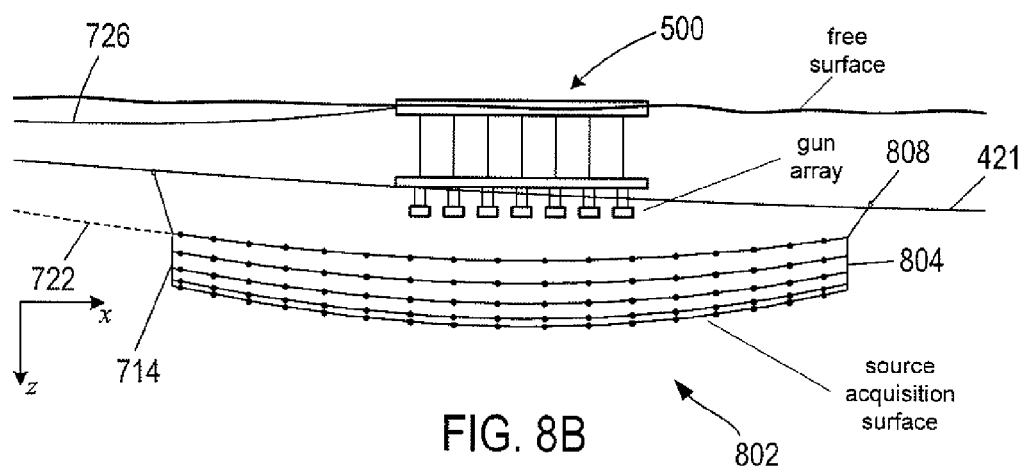

An additional transverse cable can be used to secure the tail ends of the source streamers. FIGS. 8A-8B show top and side elevation views, respectively, of an example source acquisition surface 802. The surface 802 is similar to the surface 702 described above with reference to FIG. 7, except the surface 802 includes a transverse cable 804 attached to the tail ends of source streamers 704-713. The transverse cable 804 is connected at a first end to a sliding collar 806 and is connected at a second end to a sliding collar 808. The sliding collars 806 and 808 are, in turn, attached to the streamer transmission cables 418 and 421, respectively. The transverse cable 802 adds stability and raises the depth of the tail ends of the streamers 704-713 as shown in FIG. 8B. The transverse cable 804 can also be a data transmission cable that carries signals from the streamers 704-713 to the transmission cables 720 and 722.

Figure 9:
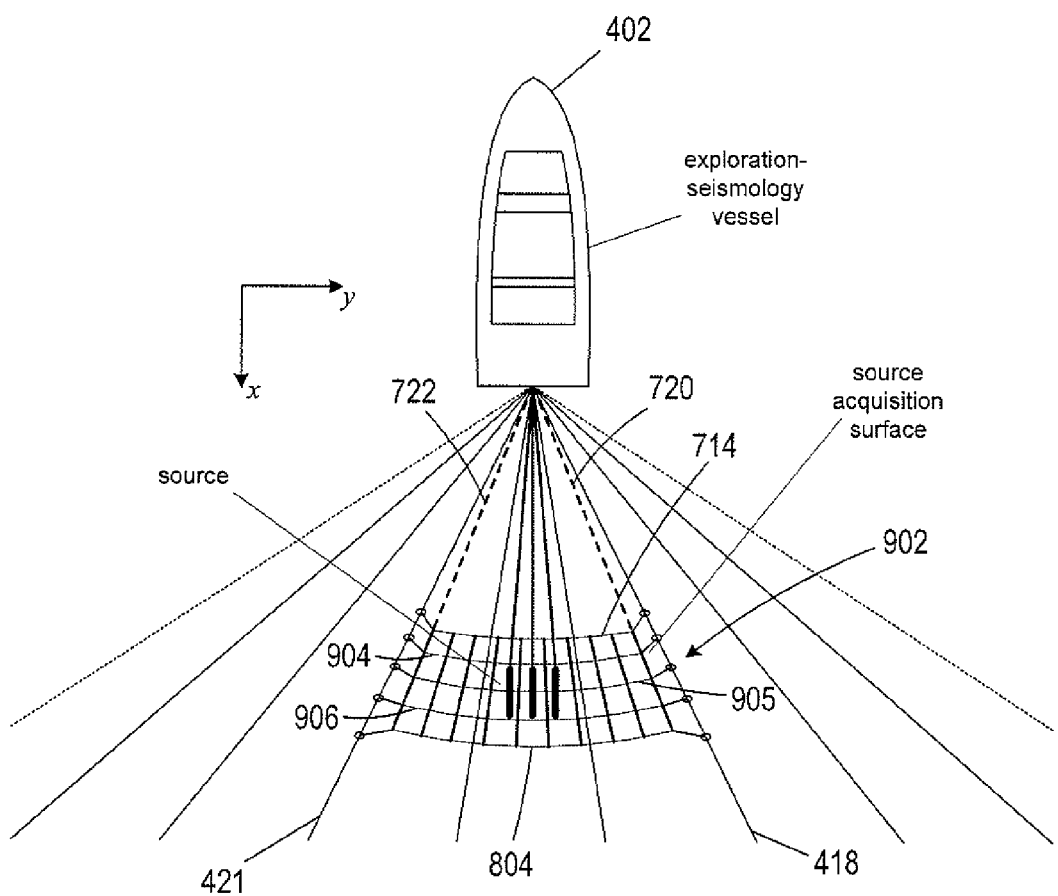
FIG. 9 shows a top view of an example netlike source acquisition surface.

A source acquisition surface can include a number of transverse cables to form a netlike source acquisition surface. FIG. 9 shows a top view of an example source acquisition surface 902. The surface 902 is similar to the surface 802, except the surface 902 includes three additional transverse cables 904-906 attached to the source streamers 704-713. Like the transverse cables 714 and 804 described above, the cables 904-906 are connected to the streamer transmission cables 418 and 421 via sliding collars. One, two, or all three of the transverse cables 904-906 can be data transmission cables that carry signals from the streamers 704-713 to the transmission cables 720 and 722.

Figure 10:
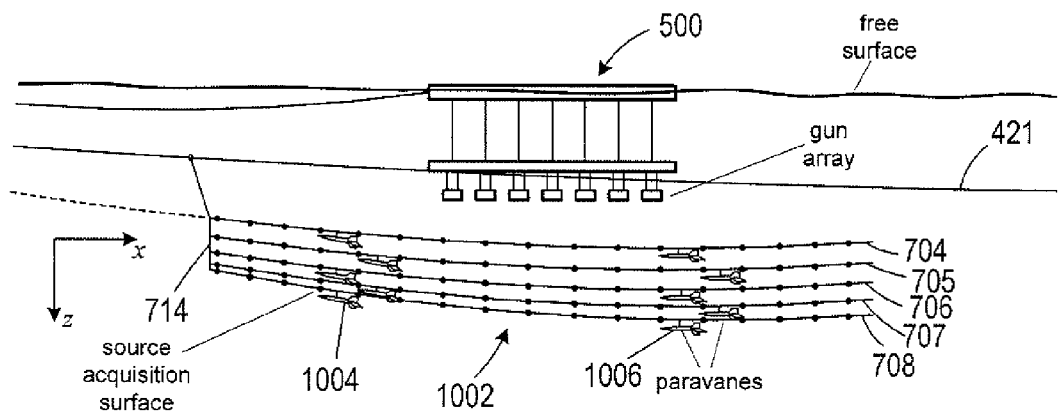
FIG. 10 shows a side elevation view an example source acquisition surface with paravanes.

The source streamers can also be equipped with depth controllers, such as paravanes or water kites, to control the position and maintain the depths of the sources streamers. FIG. 10 shows a side elevation view an example source acquisition surface 1002. In the example of FIG. 10, the surface 1002 is similar to the surface 702 described above, except each of the streamers is equipped with two paravanes, such as paravanes 1004 and 1006 attached to the streamer 708. The paravanes include wings, may include depth sensors, and may be remotely controlled to control the shapes, positions and depths of the streamers in order to form the source acquisition surface with a desired shape. In other embodiments, the source streamers may have approximately the same weight and the paravanes can be weighted and/or operated to control the shapes, positions and depths of the source streamers.

Figure 11A:
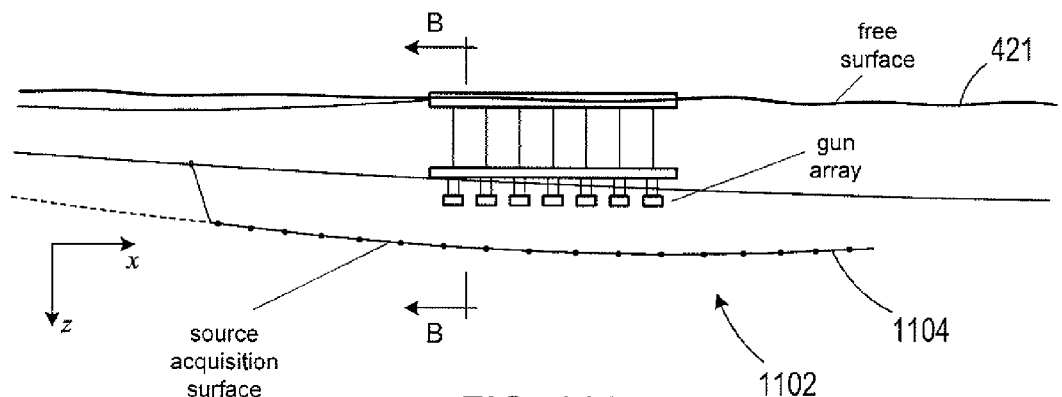
FIG. 11A shows a side elevation view of an approximately flat source acquisition surface
Figure 11B:
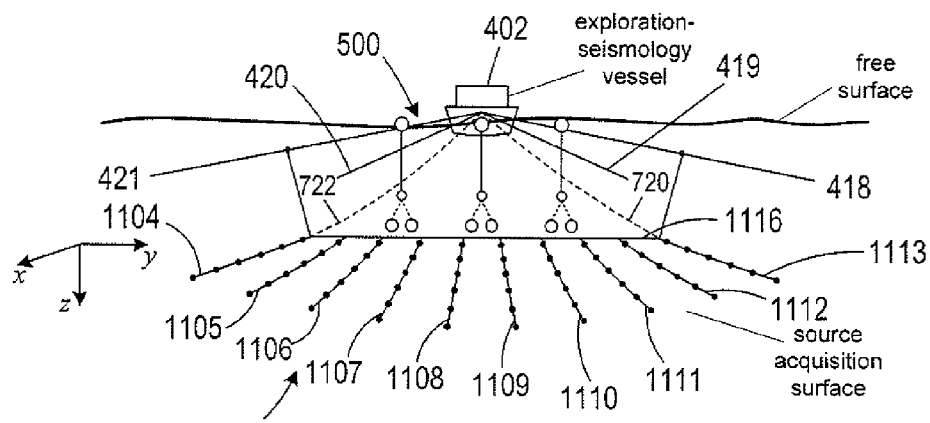
FIG. 11B shows a cross-sectional view of the flat source acquisition surface shown in FIG. 11A, along a line B-B, looking toward a seismic exploration vessel.

Source acquisition surfaces are also not limited to curved surfaces. Source acquisition surfaces may also have an approximately flat configuration. FIG. 11A shows a side elevation view of an example, approximately flat source acquisition surface 1102, and FIG. 11B shows a cross-sectional view of the surface 1102 along a line B-B, shown in FIG. 11A, looking toward the back of the vessel 402. Surface 1102 is similar to the source acquisition surface 702 except the surface 1102 is composed of source streamers 1104-1113 that have approximately the same weight in order to lie at approximately the same depth below the free surface. The streamers 1104-1113 are connected to a data transmission cable 1116 that carries signals to the transmission cables 720 and 722. The surface 1102 may also include a number of transverse cables as described above with reference to FIGS. 8-9 to form a substantially flat source acquisition surface with a netlike structure.

Figure 12A:
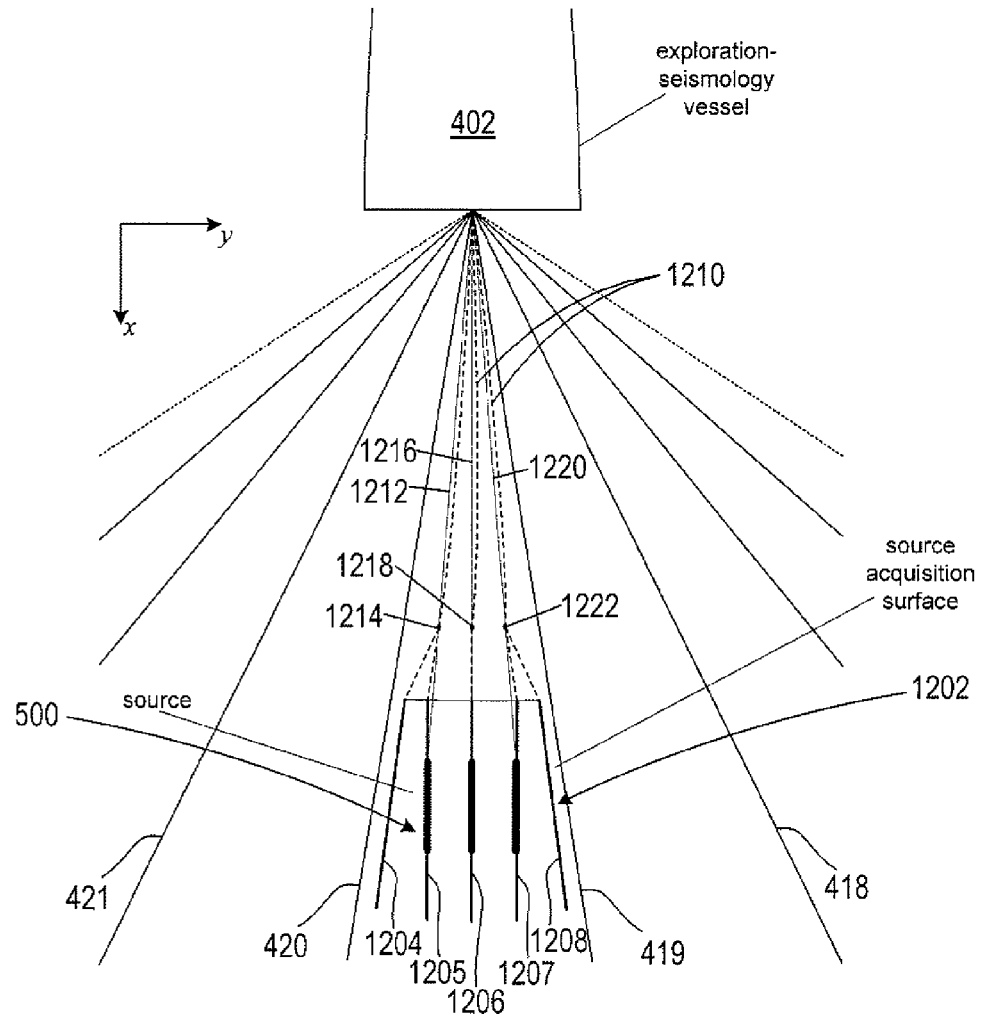
FIGS. 12A-12B show top and side elevation views, respectively, of a source acquisition surface.
Figure 12B:
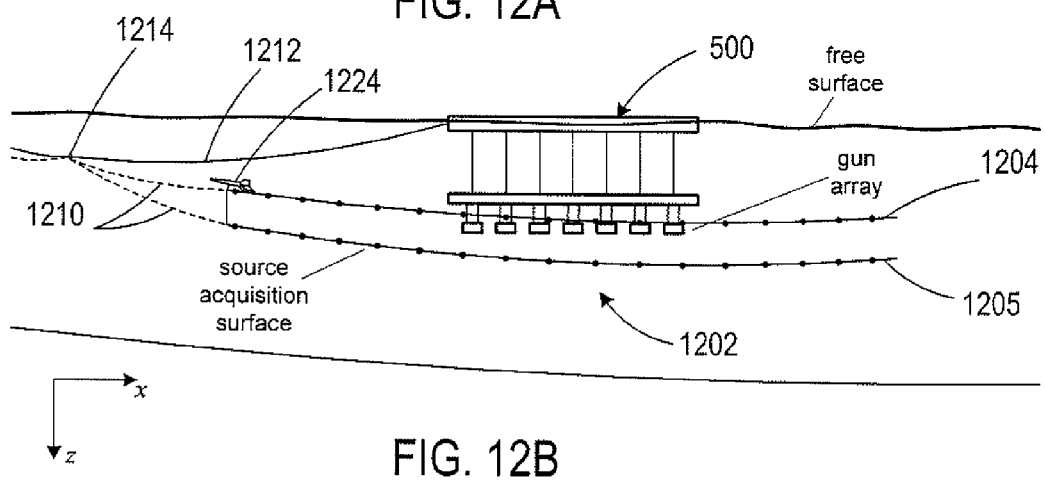

A source acquisition surface can include source streamers located below and on opposite sides of the source. FIGS. 12A-12B show top and side elevation views, respectively, of an example source acquisition surface 1202 composed of five source streamers 1204-1208. The streamers 1204-1208 are attached to data transmission cables 1210 represented by dashed lines. The data transmission cables attached to the streamers 1204 and 1205 are connected to source cable 1212 via sliding collar 1214; the data transmission cable attached to the steamer 1206 is connected to source cable 1216 via sliding collar 1218; and the transmission cables attached to the streamers 1207 and 1208 are connected to the source cable 1220 via sliding collar 1222. As shown in the example of FIG. 12, the streamers 1205-1207 are deployed below the strings of source elements of the source 500 and the streamers 1204 and 1208 are deployed at shallower depths and to the sides of the source 500. The streamers 1205-1207 measure the downgoing source wavefields, and the shallower streamers 1204 and 1208 measure horizontally propagating source wavefields. The streamers 1205-1207 can be heavier than the streamers 1204 and 1208 in order to deploy the streamers 1205-1207 deeper than the streamers 1204 and 1208. The streamers 1204-1208 can include paravanes and/or passive sideways controllers, such as paravane 1224 shown in FIG. 12B, that position the streamers 1205-1207 below the source 500 and/or position the streamers 1204 and 1208 on opposite sides of the source 500. The streamers 1204-1208 may also include buoyancy elements that position the tail ends of the streamers 1204-1208 at desired depths. In other embodiments, a source acquisition system can be composed of a single source streamer located beneath the source and have two or more source steamers located at different depths on opposite sides of the source.

Figure 13:
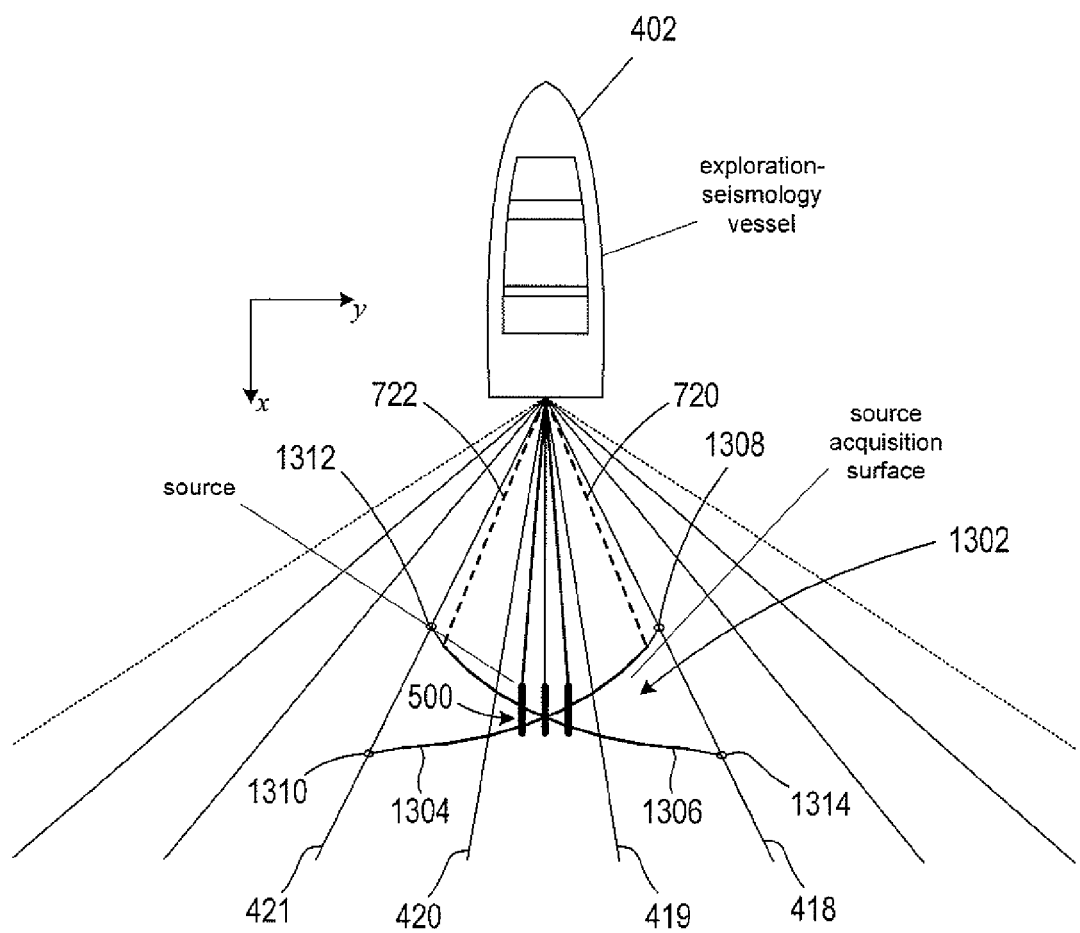
FIG. 13 shows a top view of a source acquisition surface with two source streamers that cross below a seismic source.

In other embodiments, the source acquisition surface may include only a single source streamer deployed below a source, or the source acquisition surface may have two or more source streamers that cross below the source. FIG. 13 shows a top view of an example source acquisition surface 1302 composed of two source streamers 1304 and 1306 that cross below the source 500. As shown in the example of FIG. 13, the source streamer 1304 is connected at a first end to the receiver streamer 418 via a sliding collar 1308 and at a second end to the receiver streamer 421 via a sliding collar 1310. The source streamer 1306 is connected at a first end to the receiver streamer 421 via a sliding collar 1312 and at a second end to the receiver streamer 418 via a sliding collar 1314. The streamers 1304 and 1306 are connected to the transmission cables 720 and 722, respectively.

In other embodiments, the source acquisition surface can be incorporated into the source in order to obtain near-field measurements at the guns. The near-field measurements are used to calculate notional source signatures associated with each of the guns. A notional source signature is a near-field pressure sensor measurement without the pressure wave influence of the neighboring guns. The pressure sensors can also be designed to perform direct pressure measurements while suppressing lower amplitude source ghosts. FIGS. 14A-14B show isometric and side elevation views, respectively, of an example seismic source 1400 that includes a source acquisition surface composed of pressure sensing rods 1401-1403. The source 1400 is similar to the source 500 except a set of pressure sensing rods 1401-1403 are suspended between the floats and the rods from which the guns are suspended. For example, pressure sensing rod 1401 is suspended between the float 501 and the rod 505 from which the guns $G_1$-$G_{11}$ are suspended. Each of the rods 1401-1403 includes seven pressure sensors. Each pressure sensor is positioned and designed to measure directly the pressure wave generated by the one or two guns suspended below the pressure sensor, while suppressing while suppressing the lower amplitude source ghosts. For example, the rod 1404 includes pressure sensors 1404-1410 with each of these pressure sensors located above one or two of the guns $G_1$-$G_{11}$. The pressure sensors 1401-1410 measure the near-field signatures of the corresponding guns $G_1$-$G_{11}$. In other embodiments, the pressure sensing rods can be suspended below the guns. FIGS. 15A-15B show isometric and side elevation views, respectively, of a source 1500 that includes a source acquisition surface composed of the pressure sensing rods 1401-1403. The source 1400 is similar to the seismic source 1500 except the pressure sensing rods 1401-1403 are at depths below the guns. For example, the pressure sensing rod 1401 is suspended from the rod 505 with cables 1502. In the examples of FIGS. 14 and 15, the pressure sensing rods 1401-1403 form a source acquisition surface that is incorporated within a source.

Figure 16:
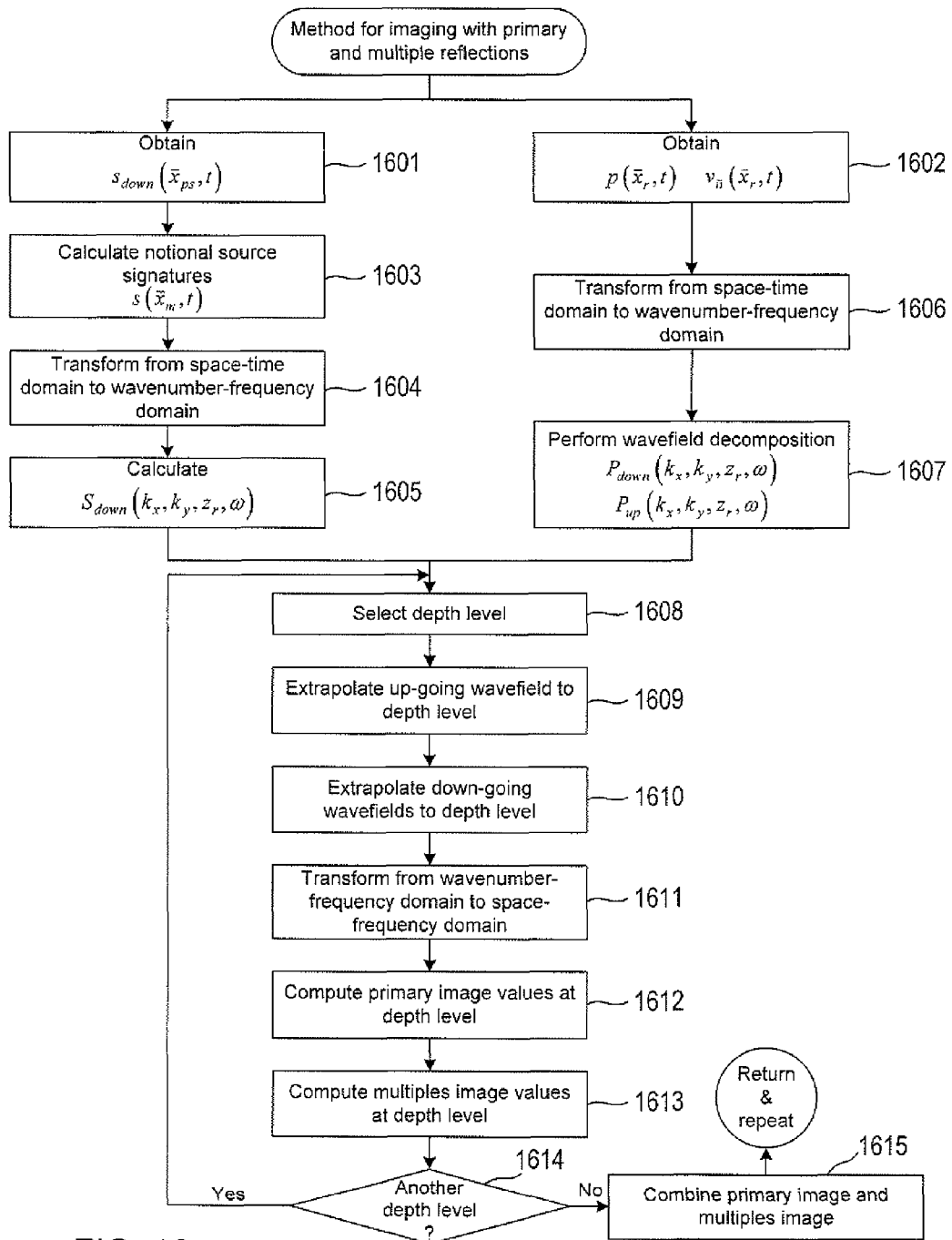
FIG. 16 shows a control-flow diagram of a method for imaging a subterranean formation with primary and multiple reflections.

Methods for Imaging with Primary and Multiple Reflections as an Example of Computational Processing Methods and Systems Computational methods and systems for computing images of a subterranean formation using primary and multiple reflections are now described. FIG. 16 shows a control-flow diagram of a method for imaging a subterranean formation with primary and multiple reflections. In FIG. 16, blocks 1601 and 1603-1605 are displayed in parallel to blocks 1602, 1606 and 1607, and in the following description, the operations associated with blocks 1603-1605 are described before the operations associated with blocks 1606 and 1607. However, blocks 1601-1607 are not intended to be limited to the particular ordering of the operations. Alternatively, the computational processes associated with blocks 1603-1605 can be executed after the computational processes associated with blocks 1606 and 1607. Alternatively, the computational processes associated with blocks 1603-1605 can be executed in parallel with the computational processes associated with blocks 1606 and 1607.

Figure 17:
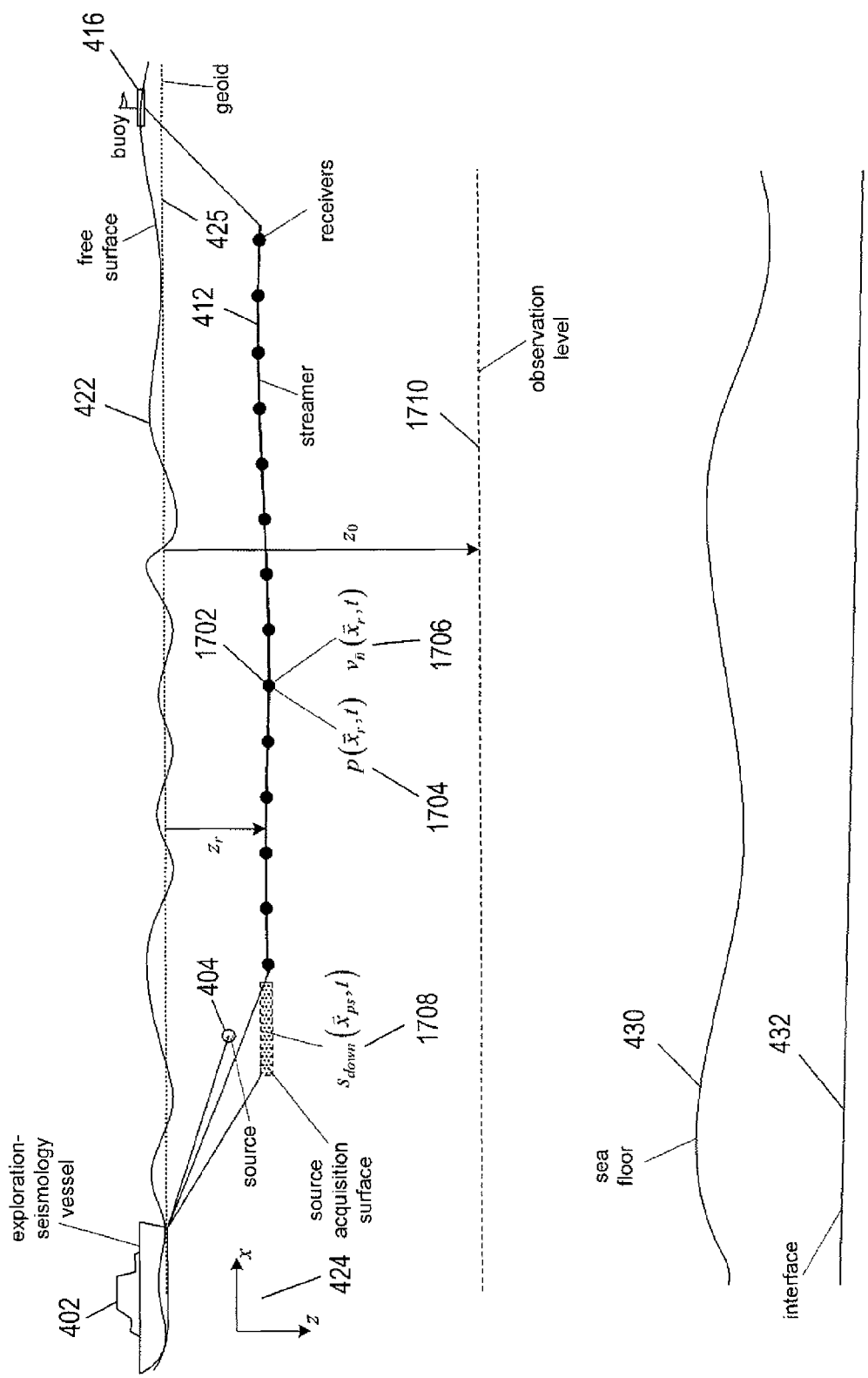
FIG. 17 shows a side elevation view of a streamer located beneath a free surface.

In block 1601, down-going source wavefields are measured at pressure sensors of the source acquisition surface, and in block 1602, pressure wavefields and normal velocity wavefields are measured at receivers of the receiver acquisition surface. FIG. 17 shows a side elevation view of the streamer 412 located beneath the free surface 422. As shown in FIG. 17, and in FIG. 4B, the source acquisition surface 406 and the receiver acquisition surface composed of the streamers 408-415 form a closed acquisition surface. The receivers of the receiver acquisition surface are dual sensors that include a pressure sensor, such as a hydrophone, and a motion sensor, such as a geophone. For example, a receiver 1702 includes a pressure sensor that measures a pressure wavefield, $p(\vec{x}_r, t)$ 1704, and includes a motion sensor that measures a normal velocity wavefield, $v_n(\vec{x}_r, t)$ 1706, where $\vec{x}_r=(x_r, y_r, z_r)$ and t represents time. The motion sensors may be mounted within a gimbal in order to orient the motion sensors to detect particle motion in a direction normal to the receiver acquisition surface. In other words, the motion sensor of the receiver 1702 senses a velocity wavefield $v_{\vec{n}}$ normal to the streamer 412 with the subscript vector $\vec{n}$ representing a normal unit vector that points downward in the xz-plane. As described above, the source acquisition surface 406 includes pressure sensors that measure the down-going source wavefield $s_{down}(\vec{x}_{ps}, t)$ 1708 generated by the source 404, where $\vec{x}_{ps}=(x_s, y_s, z_r)$ represents the coordinates of a pressure sensor in the source acquisition surface at the depth level $z_r$. This wavefield may be extrapolated (i.e., redatumed) to a reference datum from which the imaging may start.

Returning to FIG. 16, in block 1603, notional source signatures $s(\vec{x}_m, t)$ are calculated from the wavefield measured at the near-field pressure sensors, where $\vec{x}_m$ represents the coordinates $\vec{x}_m=(x_m, y_m, z_m)$ of an elemental source (e.g., air or water gun) in the source 404, shown in FIG. 14 (see e.g., "The signature of an air gun array: Computation from near-field measurements including interactions," by A. Ziolkowski et al., *Geophysics*, Vol. 47, No. 10, October 1982; "The signature of an air gun array: Computation from near-field measurements including interactions-Practical considerations," by G. E. Parkes et al., *Geophysics*, Vol. 48, No. 2, February 1984). The notional source signatures $s(\vec{x}_m, t)$ are transformed from the time domain to the frequency domain, and assuming a homogeneous acoustic medium and flat free-surface at z=0, the down-going source wavefield can be calculated in the wavenumber-frequency domain at a flat reference datum by:

$$S_{down}(k_x, k_y, z_r, \omega) = \sum_{m=1}^{n} \frac{S_m(\omega)}{-i2k_z}(e^{-ik_z(z_r-z_m)} + r_0 e^{-ik_z(z_r+z_m)})e^{-i(k_x x_m + k_y y_m)} e^{-i\omega A_{dm}} \quad (1)$$

where
i is the imaginary unit $\sqrt{-1}$,
ω is angular frequency,
$S_m(\omega)$ is the notional source signal of source element m, $t_{dm}$ is the fire time delay of source element in,
$k_x$ and $k_y$ are elements of the wavevector ($k_x$, $k_y$, $k_z$),
$r_0$ is the free surface reflection coefficient, and $$k_z = \sqrt{\left(\frac{\omega}{c}\right)^2 - k_x^2 - k_y^2}$$

with c the speed of sound in the fluid.

When the above assumptions are satisfied, the source wavefield calculated from the notional source signatures and the measured source wavefield should be equivalent. On the other hand, any differences may be used to pre-condition the inversion of the notional signatures.

In block 1606, the pressure wavefield, $p(\vec{x}_r, t)$ and the normal velocity wavefield $v_{\vec{n}}(\vec{x}_r, t)$ obtain in block 1602 can be transformed from the space-time domain to the frequency-wavenumber domain using Fourier transformations given by:

$$P(k_x,k_y,z_r,\omega) = \iiint_{-\infty}^{\infty} p(x_r,y_r,z_r,t) e^{-i(k_x x + k_y y)} e^{-i\omega t} dx\, dy\, dt \quad (2)$$

$$V_z(k_x,k_y,z_r,\omega) = \iiint_{-\infty}^{\infty} v_{\vec{n}}(x_r,y_r,z_r,t) e^{-i(k_x x + k_y y)} e^{-i\omega t} dx\, dy\, dt \quad (3)$$

In practice, the transformation from the space-time domain to the wavenumber-frequency domain can also be accomplished with discrete fast Fourier transformations. In block 1607, wavefield decomposition is performed to calculate up-going and down-going pressure wavefields from the pressure and velocity wavefields in the wavenumber-frequency domain:

$$P_{up}(k_x, k_y, z_r, \omega) = \frac{1}{2}\left(P(k_x, k_y, z_r\omega) - \frac{\rho\omega}{k_z}V_z(k_x, k_y, z_r\omega)\right) \quad (4)$$

$$P_{down}(k_x, k_y, z_r, \omega) = \frac{1}{2}\left(P(k_x, k_y, z_r\omega) + \frac{\rho\omega}{k_z}V_z(k_x, k_y, z_r\omega)\right) \quad (5)$$

Flux-normalized decomposition is an alternative wavefield separation procedure that satisfies the reciprocity of the wavefields at crossing of interfaces with impedance contrast (see, e.g., "Review of elastic and electromagnetic wave propagation in horizontally layered media," B. Ursin, *Geophysics*, 48, 1063-1081, 1983; and "Reciprocity properties of one-way propagators,", by K. Wapenaar, *Geophysics*, 63, 1795-1798, 1998).

In block 1608, a depth level $z_0$ greater than $z_r$ is selected, as represented by dashed lines 1710 in FIG. 17. In block 1609, the up-going pressure wavefield calculated in block 1607 is extrapolated to the depth level $z_0$ as follows:

$$P_{up}(k_x,k_y,z_0,\omega) = P_{up}(k_x,k_y,z_r,\omega) e^{-ik_z(z_0 - z_r)} \quad (6)$$

In block 1610, the down-going source wavefield calculated in block 1605 is extrapolated to the depth level $z_0$ as follows:

$$S_{down}(k_x,k_y,z_0,\omega) = S_{down}(k_x,k_y,z_r,\omega) e^{-ik_z(z_0 - z_r)} \quad (7)$$

and the down-going pressure wavefield calculated in block 1607 is also extrapolated to the depth level $z_0$ as follows:

$$P_{down}(k_x,k_y,z_0,\omega) = P_{down}(k_x,k_y,z_r,\omega) e^{-ik_z(z_0 - z_r)} \quad (8)$$

In block 1611, the up-going wavefield $P_{up}(k_x, k_y, z_0, \omega)$ and the down-going wavefields $S_{down}(k_x, k_y, z_0, \omega)$ and $P_{down}(k_x, k_y, z_0, \omega)$ are inverse transformed from the wavenumber-frequency domain to the space-frequency domain:

$$P_{up}(x, y, z_0, \omega) = \frac{1}{(2\pi)^2} \int\int_{-\infty}^{\infty} P_{up}(k_x, k_y, z_0, \omega) e^{i(k_x x + k_y y)} dk_x dk_y \quad (9a)$$

$$P_{down}(x, y, z_0, \omega) = \frac{1}{(2\pi)^2} \int\int_{-\infty}^{\infty} P_{down}(k_x, k_y, z_0, \omega) e^{i(k_x x + k_y y)} dk_x dk_y \quad (9b)$$

$$S_{down}(x, y, z_0, \omega) = \frac{1}{(2\pi)^2} \int\int_{-\infty}^{\infty} S_{down}(k_x, k_y, z_0, \omega) e^{i(k_x x + k_y y)} dk_x dk_y \quad (9c)$$

Next, in blocks 1612 and 1613, an imaging condition at the selected depth level is applied. In one embodiment, the imaging condition can be a cross-correlation function given by:

$$I(\vec{x},z) = \int \overline{D(\vec{x},z,\omega)} U(\vec{x},z,\omega) d\omega \quad (10)$$

where $D(\vec{x}, z, \omega)$ represents a down-going wavefield, $U(\vec{x}, z, \omega)$ represents an up-going wavefield, $\vec{x} = (x, y)$, and the overbar means complex conjugate.

In other embodiments, the imaging condition can be a deconvolution function given by:

$$I(\vec{x}, z) = \int \frac{\overline{D(\vec{x}, z, \omega)} U(\vec{x}, z, \omega)}{\frac{1}{M}\Sigma_j\left[\overline{D(\vec{x} - j\Delta\vec{x}, z, \omega)} D(\vec{x} - j\Delta\vec{x}, z, \omega)\right] + \alpha(\vec{x}, z, \omega)} d\omega \quad (11)$$

where $\Delta\vec{x}$ is the difference between adjacent horizontal wavefield positions, and $\alpha(\vec{x}, z, \omega)$ is a stabilization parameter that may be included to avoid unstable division by small values of $D(\vec{x}, z, \omega)$.

The integrals in Equations (10) and (11) can be evaluated using numerical integration. The imaging conditions generate image pixel values. In other words, $I(\vec{x}, z)$ is a pixel in a digital image of a subterranean formation. In block 1612, when the cross-correlation function given by Equation (10) is used, primary image values at the depth level $z_0$ are calculated by:

$$I_{primary}(\vec{x},z_0) = \int \overline{S_{down}(\vec{x},z_0,\omega)} P_{up}(\vec{x},z_0,\omega) d\omega \quad (12)$$

and, in block 1613, multiples image values at the depth level $z_0$ are calculated using the cross-correlation function as follows:

$$I_{multiples}(\vec{x},z_0) = \int \overline{P_{down}(\vec{x},z_0,\omega)} P_{up}(\vec{x},z_0,\omega) d\omega \quad (13)$$

In block 1612, when the deconvolution function given by Equation (11) is used, primary image values at the depth level $z_0$ are calculated by:

$$I_{primary}(\vec{x}, z_0) = \int \frac{\overline{S_{down}(\vec{x}, z, \omega)} P_{up}(\vec{x}, z_0, \omega)}{\frac{1}{M}\Sigma_j\left[\overline{S_{down}(\vec{x} - j\Delta\vec{x}, z, \omega)} S_{down}(\vec{x} - j\Delta\vec{x}, z, \omega)\right] + \alpha(\vec{x}, z, \omega)} d\omega \quad (14)$$

and, in block 1613, multiples image values are calculated at the depth level $z_0$ using the deconvolution function as follows:

$$I_{multiples}(\vec{x}, z_0) = \int \frac{\overline{P_{down}(\vec{x}, z, \omega)} P_{up}(\vec{x}, z_0, \omega)}{\frac{1}{M}\Sigma_j \left[\overline{P_{down}(\vec{x} - j\Delta\vec{x}, z, \omega)} P_{down}(\vec{x} - j\Delta\vec{x}, z, \omega)\right] + \alpha(\vec{x}, z, \omega)} d\omega \quad (15)$$

Note that in imaging with primary reflections, the deconvolution imaging condition given by Equation (11) is often used rather than the cross-correlation function given by Equation (10) in order to remove a source signature imprint from the final image of a subterranean formation. Use of the deconvolution imaging condition is however important for imaging with multiple reflections because of the complex source signatures, including secondary sources.

In block 1614, when another depth level greater than $z_r$ is selected, the operations associated with blocks 1608-1613 are repeated to obtain primary image values and multiples image values for the depth level. The operations of blocks 1608 and 1609 are repeated for a series of depth levels to obtain a primary image of the subterranean formation and a multiples image of the subterranean formation. In block 1615, the primary image and the multiples image are added to obtain a three-dimensional resultant image of the subterranean formation given by:

$$I_{resultant}(x,y,z) = I_{primary}(x,y,z) + I_{multiples}(x,y,z) \quad (16)$$

Note that when the deconvolution function given by Equations (11) and (14) is selected as the imaging condition, deghosting of the down-going source wavefield $S_{down}$ is not necessary. On the other hand, when the cross-correlation function given by Equations (10) and (12) is selected, the down-going source wavefield $S_{down}$ is deghosted in a separate operation.

The computation methods described above with reference to FIG. 16 can be applied to image a subterranean formation when the source acquisition surface used to measure the down-going source wavefield is one of the various types of source acquisitions surfaces described above with reference to FIGS. 7-13. On the other hand, when the source acquisition surface is incorporated in the source, as described above with reference to FIGS. 14 and 15, the hydrophones measure the source wavefield directly from the guns and suppress the lower amplitude source ghost. As a result, the down-going source wavefield in block 1605 can be calculated using:

$$S_{down}(k_x, k_y, z_r, \omega) = \sum_{m=1}^{n} \frac{S_m(\omega)}{-i2k_z}(e^{-ik_z(z_r - z_m)}) e^{-i(k_x x_m + k_y y_m)} e^{-i\omega t_d m} \quad (17)$$

Equation (17) is the same as Equation (1) except the reflection coefficient $r_0$ is assigned value zero. As a result, the down-going source wavefield does not need to be source deghosted during imaging and the down-going source wavefield may be used when source deghosting is not necessary which is when multiple reflections have been removed from the seismic data.

Figure 18:
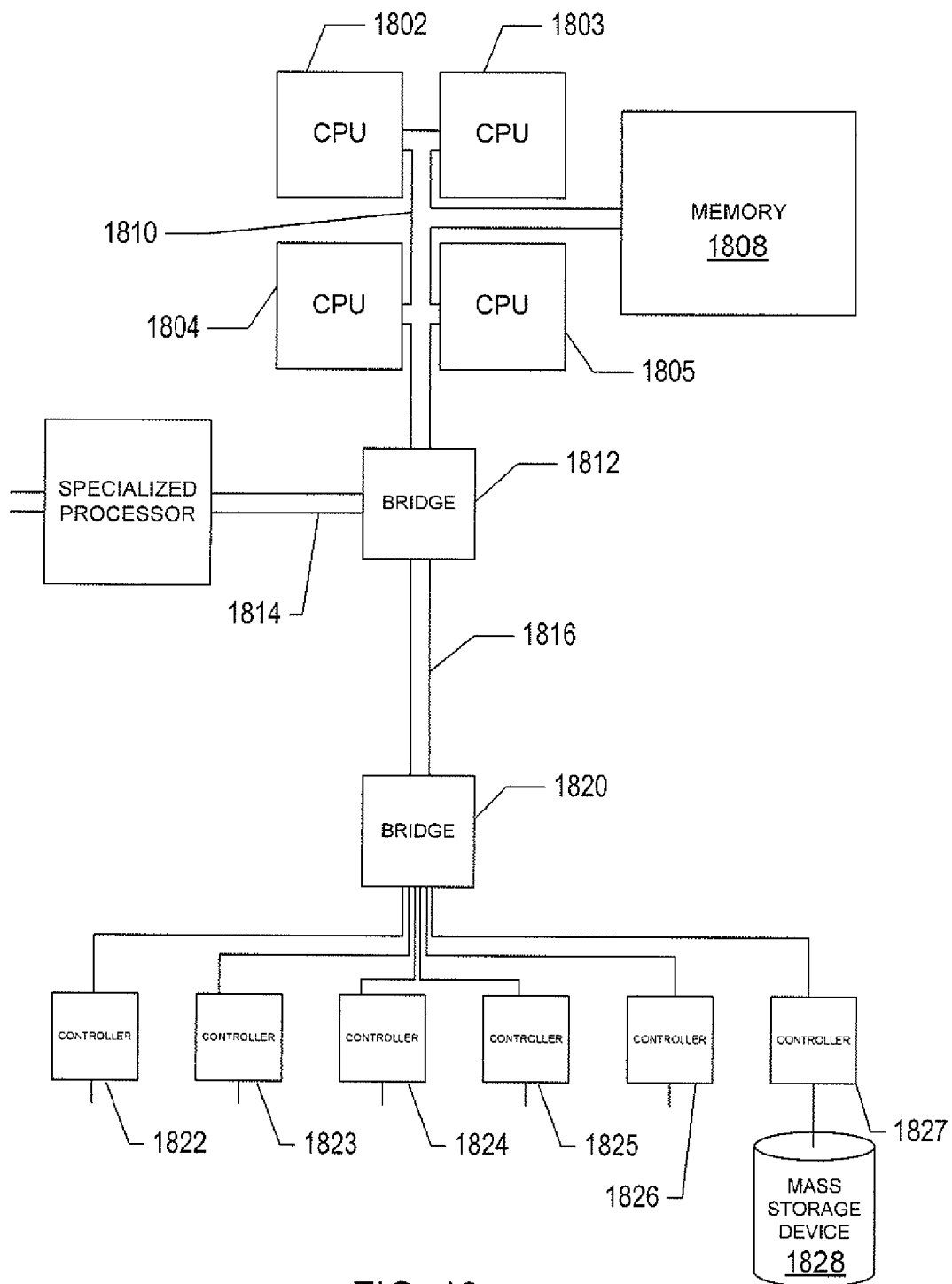
FIG. 18 shows one example of a generalized computer system that executes an efficient method for computing three-dimensional images of a subterranean formation beneath a fluid volume.

FIG. 18 shows one illustrative example of a generalized computer system that executes an efficient method for computing images of a subterranean formation using primary and multiple reflections and therefore represents a seismic-analysis data-processing system to which the description is directed. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1802-1805, one or more electronic memories 1808 interconnected with the CPUs by a CPU/memory-subsystem bus 1810 or multiple busses, a first bridge 1812 that interconnects the CPU/memory-subsystem bus 1810 with additional busses 1814 and 1816, or other types of high-speed interconnection media, including multiple, high-speed serial interconnects. These busses or serial interconnections, in turn, connect the CPUs and memory with specialized processors, such as a graphics processor 1818, and with one or more additional bridges 1820, which are interconnected with high-speed serial links or with multiple controllers 1822-1827, such as controller 1827, that provide access to various different types of computer-readable media, such as computer-readable medium 1828, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1828 is a data-storage device, including electronic memory, optical or magnetic disk drive, USB drive, flash memory and other such data-storage device. The computer-readable medium 1828 can be used to store machine-readable instructions associated with the computational methods described above and can be used to store encoded data, during store operations, and from which encoded data can be retrieved, during read operations, by computer systems, data-storage systems, and peripheral devices.

The foregoing description, for purposes of explanation, used specific nomenclature to provide a thorough understanding of the disclosure. However, it will be apparent to one skilled in the art that the specific details are not required in order to practice the systems and methods described herein. For example, any number of different computational-processing-method implementations that carry out efficient generating a three-dimensional imaging of a subterranean formation may be designed and developed using various different programming languages and computer platforms and by varying different implementation parameters, including control structures, variables, data structures, modular organization, and other such parameters. The computational representations of wavefields, operators, and other computational objects may be implemented in different ways.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for computing images of a subterranean formation to be carried out by a computer system that includes one or more processors and one or more data-storage devices, the method comprising:

calculating a down-going source wavefield from a pressure wavefield measured on a source acquisition surface towed by a seismic exploration vessel;

decomposing a pressure wavefield measured on a receiver acquisition surface towed by the vessel into an up-going pressure wavefield and a down-going pressure wavefield; and computing an image of the subterranean formation based on the down-going source wavefield combined with the down-going pressure wavefield and the up-going pressure wavefield.

2. The method of claim 1, wherein calculating the down-going source wavefield from the pressure wavefield comprises:

calculating notional source signatures from near-field pressure recordings; and transforming the notional source signatures from a space-time domain to a wavenumber-frequency domain, wherein each notional source signature is associated with an element of a seismic source towed by the vessel.

3. The method of claim 1, wherein decomposing the pressure wavefield comprises:

transforming the measured pressure wavefield and the normal velocity wavefield from a space-time domain to a wavenumber-frequency domain;

calculating the up-going pressure wavefield as a function of the pressure and normal velocity wavefields in the wavenumber-frequency domain; and calculating the down-going pressure wavefield as a function of the pressure and normal velocity wavefields in the wavenumber-frequency domain.

4. The method of claim 1, wherein calculating the down-going source wavefield from the pressure wavefield includes:

constraining the calculation of notional source signatures based on the measured source wavefield at the source acquisition surface.

5. The method of claim 1, wherein computing a first image of the subterranean formation based on the down-going source wavefield and the up-going pressure wavefield comprises:

for each depth level:
extrapolating the down-going source wavefield and the up-going pressure wavefield to a depth level;
transforming the down-going source wavefield and the up-going pressure wavefield from the wavenumber-frequency domain to the space-frequency domain; and
calculating image values using an imaging condition.

6. The method of claim 1, wherein computing a second image of the subterranean formation based on the up-going and down-going pressure wavefields comprises:

for each depth level:
extrapolating the up-going and down-going pressure wavefields to a depth level;
transforming from the wavenumber-frequency domain to the space-frequency domain; and
calculating image values using an imaging condition.

7. A computer-readable medium having machine-readable instructions encoded thereon for enabling one or more processors of a computer system to perform the operations of calculating a down-going source wavefield from a pressure wavefield measured on a source acquisition surface towed by a seismic exploration vessel;

decomposing a pressure wavefield measured on a receiver acquisition surface towed by the vessel into an up-going pressure wavefield and a down-going pressure wavefield; and calculating an image of the subterranean formation as a function of the down-going source wavefield, the up-going pressure wavefield, and the down-going pressure wavefield.

8. The computer-readable medium of claim 7, wherein calculating the down-going source wavefield from the pressure wavefield includes:

constraining the calculation of notional source signatures based on the measured source wavefield at the source acquisition surface.

9. The computer-readable medium of claim 7, wherein calculating the down-going source wavefield from the pressure wavefield comprises:

calculating notional source signatures from the near-field pressure recordings; and transforming the notional source signatures from a space-time domain to a wavenumber-frequency domain, wherein each notional source signature is associated with an element of a seismic source towed by the vessel.

10. The computer-readable medium of claim 7, wherein decomposing the pressure wavefield and the normal velocity wavefield comprises:

transforming the measured pressure wavefield and a normal velocity wavefield measured on the receiver acquisition surface from a space-time domain to a wavenumber-frequency domain;

calculating the up-going pressure wavefield as a function of the pressure and normal velocity wavefields in the wavenumber-frequency domain; and calculating the down-going pressure wavefield as a function of the pressure and normal velocity wavefields in the wavenumber-frequency domain.

11. The computer-readable medium of claim 7, wherein calculating an image of the subterranean formation comprising:

computing a first image of the subterranean formation based on the down-going source wavefield and the up-going pressure wavefield;

computing a second image of the subterranean formation based on the up-going and down-going pressure wavefields; and adding the first image and the second image to form the image of the subterranean formation.

12. The computer-readable medium of claim 11, wherein computing the first image of the subterranean formation based on the down-going source wavefield and the up-going pressure wavefield comprises:

for each depth level:
extrapolating the down-going source wavefield and the up-going pressure wavefield to a depth level;
transforming the down-going source wavefield and the up-going pressure wavefield from the wavenumber-frequency domain to the space-frequency domain; and
calculating image values using an imaging condition.

13. The computer-readable medium of claim 11, wherein computing the second image of the subterranean formation based on the up-going and down-going pressure wavefields comprises:

for each depth level:
extrapolating the up-going and down-going pressure wavefields to a depth level;
transforming the from the wavenumber-frequency domain to the space-frequency domain; and
calculating image values using an imaging condition.

14. A system for measuring wavefields in fluid volume, the system comprising:

a seismic source to be connected to a vessel and towed below a free surface of a fluid volume;

a source acquisition surface to be connected to the vessel and towed beneath the source to measure pressure wavefields generated by the source; and a receiver acquisition surface to be connected to the vessel and towed behind the source acquisition surface to measure pressure and normal velocity wavefields associated with the pressure wavefields generated by the source.

15. The system of claim 14, wherein the source acquisition surface comprises one or more source streamers, each source streamer having one or more pressure sensors distributed along the length of the source streamer.

16. The system of claim 15, wherein the source acquisition surface further comprises a transverse data transmission cable having a first end connected to a first source data transmission cable and a second end connected to a second data transmission cable, wherein the source streamers are connected to the transverse data transmission cable and the source data transmission cables are connected to the vessel.

17. The system of claim 15, wherein the source acquisition surface further comprises one or more transverse cables connected to the source streamers.

18. The system of claim 15, wherein the source streamers are weighted to form a curved source acquisition surface.

19. The system of claim 15, wherein the source streamers have approximately the same weight to place the source streamers at approximately the same depth.

20. The system of claim 15, wherein each source streamer further comprises one or more depth controllers to control the depth and position of the source streamer.

21. The system of claim 15, wherein the source streamers are crossed.

22. The system of claim 14, wherein the source acquisition surface to be connected to the vessel and towed beneath the source further comprises a single streamer towed beneath the source to measure a down-going source wavefield and one or more streamers towed to a first side of the source and one or more streamers towed to a second side of the source located opposite the first side, the one or more streamers to measure down-going and horizontally propagating wavefields.

* * * * *